(12) United States Patent
Kim et al.

(10) Patent No.: US 12,299,792 B2
(45) Date of Patent: May 13, 2025

(54) ELECTRONIC DEVICE FOR GENERATING MOUTH SHAPE AND METHOD FOR OPERATING THEREOF

(71) Applicant: SAMSUNG ELECTRONICS CO., LTD., Suwon-si (KR)

(72) Inventors: Jooyoung Kim, Suwon-si (KR); Jihyeok Yoon, Suwon-si (KR); Sunyoung Jung, Suwon-si (KR); Junsik Jeong, Suwon-si (KR); Haegang Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 17/866,114

(22) Filed: Jul. 15, 2022

(65) Prior Publication Data

US 2023/0014604 A1    Jan. 19, 2023

Related U.S. Application Data

(63) Continuation of application No. PCT/KR2022/009589, filed on Jul. 4, 2022.

(30) Foreign Application Priority Data

Jul. 16, 2021 (KR) .......... 10-2021-0093812
Aug. 31, 2021 (KR) .......... 10-2021-0115930

(51) Int. Cl.
  *G06T 13/00* (2011.01)
  *G06T 3/4053* (2024.01)
  (Continued)

(52) U.S. Cl.
  CPC .......... *G06T 13/00* (2013.01); *G06T 3/4053* (2013.01); *G06T 7/11* (2017.01); *G06T 11/00* (2013.01); *G10L 13/02* (2013.01); *G06T 2200/24* (2013.01)

(58) Field of Classification Search
  None
  See application file for complete search history.

(56) References Cited

U.S. PATENT DOCUMENTS 6,539,354 B1    3/2003    Sutton et al.
7,168,953 B1 *  1/2007    Poggio .................. G06T 13/205
                                                    704/E21.02

(Continued)

FOREIGN PATENT DOCUMENTS

CN    111277912 A    6/2020
JP      0644365 A    2/1994

(Continued)

OTHER PUBLICATIONS

Suwajanakorn et al., "Synthesizing obama: learning lip sync from audio," ACM Transactions on Graphics (ToG) 36.4 (2017): 1-13 (Year: 2017).*

(Continued)

*Primary Examiner* — Anh-Tuan V Nguyen
(74) *Attorney, Agent, or Firm* — Sughrue Mion, PLLC

(57) ABSTRACT

An electronic device includes at least one processor, and at least one memory storing instructions executable by the at least one processor and operatively connected to the at least one processor, where the at least one processor is configured to acquire voice data to be synthesized with at least one first image, generate a plurality of mouth shape candidates by using the voice data, select a mouth shape candidate among the plurality of mouth shape candidates, generate at least one second image based on the selected mouth shape candidate and at least a portion of each of the at least one first image, and generate at least one third image by applying at least one super-resolution model to the at least one second image.

17 Claims, 29 Drawing Sheets

(51) Int. Cl.
  *G06T 7/11*   (2017.01)
  *G06T 11/00*  (2006.01)
  *G10L 13/02*  (2013.01)

(56) References Cited

U.S. PATENT DOCUMENTS

| | | | |
|---|---|---|---|
| 2001/0050689 A1* | 12/2001 | Park | G06T 11/00 |
| | | | 345/629 |
| 2002/0114534 A1 | 8/2002 | Nakamura et al. | |
| 2006/0012601 A1 | 1/2006 | Francini et al. | |
| 2006/0164440 A1* | 7/2006 | Sullivan | G06T 19/20 |
| | | | 345/639 |
| 2009/0240734 A1* | 9/2009 | Lloyd-Jones | G11B 27/10 |
| 2010/0171759 A1* | 7/2010 | Nickolov | G06T 3/40 |
| | | | 345/660 |
| 2011/0224978 A1* | 9/2011 | Sawada | G06V 40/16 |
| | | | 704/E15.001 |
| 2013/0195428 A1 | 8/2013 | Marks et al. | |
| 2013/0343647 A1 | 12/2013 | Aoki | |
| 2015/0195397 A1* | 7/2015 | Rice | G06T 19/006 |
| | | | 345/619 |
| 2015/0242394 A1 | 8/2015 | Kim | |
| 2016/0267686 A1 | 9/2016 | Ohta | |
| 2017/0287481 A1 | 10/2017 | Bhat et al. | |
| 2017/0345201 A1 | 11/2017 | Lin et al. | |
| 2018/0232561 A1 | 8/2018 | Zheng et al. | |
| 2019/0244623 A1 | 8/2019 | Hall et al. | |
| 2019/0332851 A1 | 10/2019 | Han et al. | |
| 2019/0392625 A1 | 12/2019 | Wang et al. | |
| 2020/0058288 A1* | 2/2020 | Lin | G06F 9/451 |
| 2020/0234480 A1* | 7/2020 | Volkov | G06V 40/171 |
| 2020/0296535 A1 | 9/2020 | Tsingos et al. | |
| 2021/0005180 A1 | 1/2021 | Kim | |
| 2021/0150793 A1* | 5/2021 | Stratton | H04N 21/234 |
| 2021/0312685 A1* | 10/2021 | Guo | G06T 17/20 |
| 2021/0390748 A1* | 12/2021 | Liao | G06N 3/08 |

FOREIGN PATENT DOCUMENTS

| | | | |
|---|---|---|---|
| JP | 6-348811 A | | 12/1994 |
| JP | 2000348173 A | | 12/2000 |
| JP | 2002170112 A | | 6/2002 |
| JP | 2016-173790 A | | 9/2016 |
| JP | 2019175210 A | | 10/2019 |
| KR | 19980058764 A | | 10/1998 |
| KR | 19990034391 A | | 5/1999 |
| KR | 2000-0009490 A | | 2/2000 |
| KR | 1020050009504 A | | 1/2005 |
| KR | 10-2014-0037410 A | | 3/2014 |
| KR | 10-2016-0110039 A | | 9/2016 |
| KR | 10-1827168 B1 | | 2/2018 |
| KR | 10-2018-0109634 A | | 10/2018 |
| KR | 10-2019-0111278 A | | 10/2019 |
| KR | 10-2019-0114150 A | | 10/2019 |
| KR | 10-2251781 B1 | | 5/2021 |
| WO | 2009/114488 A1 | | 9/2009 |
| WO | 2012-120697 A1 | | 9/2012 |
| WO | 2017190646 A1 | | 11/2017 |

OTHER PUBLICATIONS

International Search Report (PCT/ISA/210) and Written Opinion (PCT/ISA/237) dated Oct. 5, 2022 issued by the International Searching Authority in International Application No. PCT/KR2022/009589.
Search Report dated Jul. 3, 2024, issued by the European Patent Office in European Application No. 22842351.3.
Communication dated Sep. 18, 2024, issued by the European Patent Office in counterpart European Application No. 22842351.3.

* cited by examiner

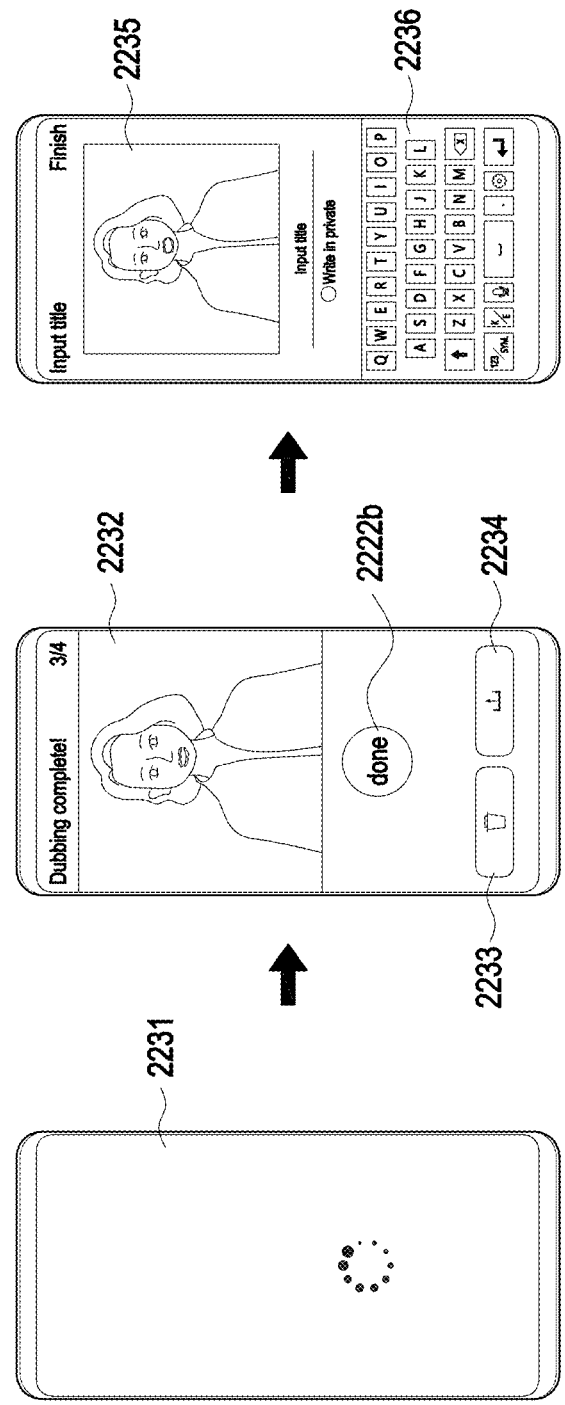

ELECTRONIC DEVICE FOR GENERATING MOUTH SHAPE AND METHOD FOR OPERATING THEREOF

CROSS-REFERENCE TO RELATED APPLICATION(S)

This application is a continuation application, claiming priority under § 365(c), of an International application No. PCT/KR2022/009589, filed on Jul. 4, 2022, which is based on and claims the benefits of a Korean patent application number 10-2021-0093812, filed on Jul. 16, 2021, and a Korean patent application number 10-2021-0115930, filed on Aug. 31, 2021 in the Korean Intellectual Property Office, the disclosure of which is incorporated by reference herein in its entirety.

BACKGROUND

Field

Various embodiments of the present disclosure relate to an electronic device for generating a mouth shape and a method of operating the same, and more particularly, to an electronic device for generating a mouth shape corresponding to voice data and a method of operating the same.

Description of Related Art

An artificial intelligence technology is applied to various fields. For example, artificial intelligence models for generating mouth shapes corresponding to voice data have been developed. A research team of Paul G. Allen in the University of Washington has developed artificial intelligence models for converting voice data into a realistic lip-synced video. A mouth shape for speaking voice data may be generated by the artificial intelligence model, and the generated mouth shape may be synthesized with a head part of the existing image. Accordingly, in a video, a person speaks input data through a mouth shape corresponding to voice data.

For example, when voice data is input into an artificial intelligence model based on a recurrent neural network (RNN), a sparse shape indicating a mouth shape (or expressing a mouth shape) may be generated. A mouth shape texture may be generated on the basis of the sparse shape, and the corresponding mouth shape texture may be synthesized with each of images included in a target video. Meanwhile, in addition to the artificial intelligence model based on the RNN, a mouth shape generation technology using artificial intelligence models based on various artificial neural networks has been researched.

SUMMARY

As described above, in order to generate a more realistic mouth shape, an artificial model (for example, an RNN-based artificial intelligence model) is required to be appropriately trained. When appropriate training is not performed, an unnatural mouth shape may be generated. Particularly, it is known that people are very sensitive to unnatural mouth parts, and for example, when teeth are unnaturally rendered or a jaw moves at an incorrect time, it may be easily recognized that a video is fake. However, even though a plurality of pieces of training data are used, a possibility of generating a complete synthetic image may be low for all cases. Further, in order to generate the existing mouth shape, only one artificial intelligence model is applied and/or executed. Accordingly, even when an unnatural mouth shape is generated due to incomplete training, it is not possible to modify the corresponding video or many resources should be used for the modification. This results from the use of only one mouth shape generation model.

An electronic device and a method of operating the same according to various embodiments may generate a plurality of mouth shape candidates from one voice data and generate an image including a mouth shape mouth selected from the plurality of mouth shape candidates.

According to an aspect of the disclosure, an electronic device includes at least one processor, and at least one memory storing instructions executable by the at least one processor and operatively connected to the at least one processor, wherein the at least one processor is configured to acquire voice data to be synthesized with at least one first image, generate a plurality of mouth shape candidates by using the voice data, select a mouth shape candidate among the plurality of mouth shape candidates, generate at least one second image based on the selected mouth shape candidate and at least a portion of each of the at least one first image, and generate at least one third image by applying at least one super-resolution model to the at least one second image.

According to another aspect of the disclosure, a method of operating an electronic device includes acquiring voice data to be synthesized with at least one first image, generating a plurality of mouth shape candidates by using the voice data, selecting a mouth shape candidate among the plurality of mouth shape candidates, generating at least one second image based on the selected mouth shape candidate and at least a portion of each of the at least one first image, and generating at least one third image by applying at least one super-resolution model to the at least one second image.

According to another aspect of the disclosure, a non-transitory computer-readable storage medium storing at least one instruction is provided. When the instructions are executed, the at least one instruction may cause the at least one processor to acquire voice data to be synthesized with at least one first image, generate a plurality of mouth shape candidates by using the voice data, select a mouth shape candidate among the plurality of mouth shape candidates, generate at least one second image based on the selected mouth shape candidate and at least a portion of each of the at least one first image, and generate at least one third image by applying at least one super-resolution model to the at least one second image.

According to an aspect of the disclosure, an electronic device includes at least one processor, a display module operatively connected to the at least one processor, and at least one memory storing at least one instruction executable by the processor and operatively connected to the at least one processor, wherein the at least one processor is configured to acquire voice data to be synthesized with at least one first image, display a plurality of mouth shape candidates generated using the voice data on the display module, identify selection of a first mouth shape candidate among the plurality of mouth shape candidates displayed on the display module, and display at least one second image including the first mouth shape candidate on the display module by using the first mouth shape candidate and at least a portion of each of the at least one first image.

According to various embodiments, an electronic device and a method of operating the same capable of generating a plurality of mouth shape candidates from one voice data and generating an image including a mouth shape candidate selected from the plurality of mouth shape candidates can be provided. Accordingly, it is possible to generate more natural mouth shapes unlike the conventional technology of generating one mouth shape on the basis of one artificial intelligence model.

DESCRIPTION OF DRAWINGS

FIGS. 22A to 22C illustrate screens of the electronic device according to various embodiments.

DETAILED DESCRIPTION

Figure 1:
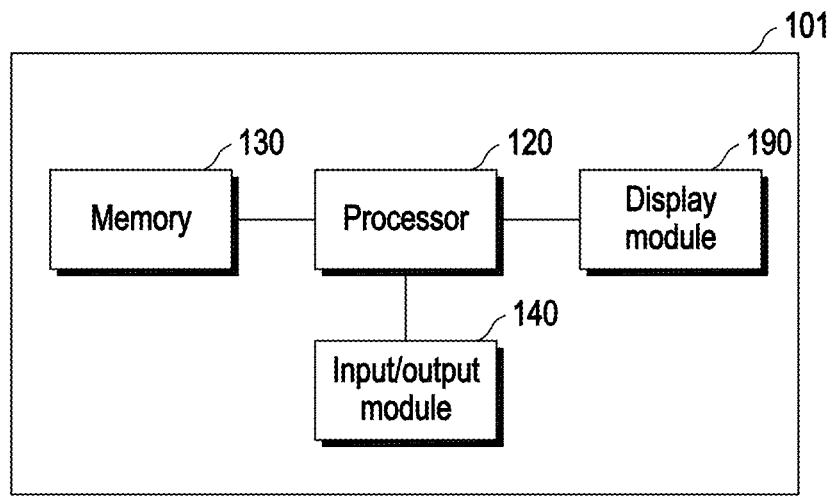
FIG. 1 is a block diagram of an electronic device according to various embodiments.

FIG. 1 is a block diagram of an electronic device according to various embodiments.

According to various embodiments, an electronic device 101 may include at least one of a processor 120, a memory 130, an input/output module 140, or a display module 190.

According to various embodiments, the processor 120 may control at least one other element (for example, hardware or software elements) connected to the at least one processor 120 of the electronic device 101 by executing, for example, software (for example, a program) and perform various data processing or calculations. Software may store various models (or algorithms), for example, a face detection model, a mouth shape generation model, a landmark detection model, a super-resolution model, an image synthesis model, an image separation model, a voice data generation model, an avatar (or character) generation model, and the like, and has no limitation if the software performs an operation by the disclosure. At least some of the various models may be artificial intelligence models generated according to training, but it may be understood by those skilled in the art that at least some of the various models may include algorithms for processing an input value to output a target output value as well as the artificial intelligence model. As at least a portion of the data processing or calculations, the processor 120 may store commands or data received from another element in the memory 130, process the commands or data stored in the memory 130, and store resultant data in the memory 130. According to an embodiment, the processor 120 may include at least some of a central processing unit, an application processor, a neural processing unit (NPU), or a communication processor, but there is no limitation in the type of the processor 120. The neural processing unit may include a hardware structure specialized for processing an artificial intelligence model. A model included in or executed by the artificial intelligence model may include machine learning (for example, supervised learning, unsupervised learning, semi-supervised learning, or reinforcement learning), but is not limited thereto. The artificial intelligence model may include a plurality of artificial neural network layers. The artificial neural network may be a model based on one of a deep neural network (DNN), a generative adversarial network (GAN), a convolutional neural network (CNN), a recurrent neural network (RNN), a restricted Boltzmann machine (BBM), a deep belief network (DBN), a bidirectional recurrent deep neural network (BRDNN), deep Q-networks, or a combination of two or more thereof, but is not limited thereto. The artificial intelligence model may additionally or alternatively include a software structure as well as a hardware structure. For example, the artificial intelligence model may be a neural network including a value of a parameter for each of at least one layer and/or node for receiving at least one piece of input data and outputting at least one piece of output data, algorithms for outputting output data by a neural network, a set of a plurality of algorithms, a processor for executing the algorithms or a set thereof, software for executing the algorithms or a set thereof, or hardware for executing the algorithms or a set thereof.

According to various embodiments, the memory 130 may include at least one type of storage medium among a flash memory, a hard disk, a multimedia card micro, a card type memory (for example, an SD memory, an XD memory, or the like), a random access memory (RAM), a static RAM (SRAM), a read-only memory (ROM), an electrically erasable programmable ROM (EEPROM), a programmable read-only memory (PROM), a magnetic memory, a magnetic disk, and an optical disk, but there is not limitation if the device can store data. At least a portion of the memory 130 may be separated from the processor 120 and/or at least another portion of the memory 130 may be located within the processor 120. In various embodiments, an operation performed by the electronic device 101 may be understood as an operation by the processor 120 or an operation by another piece of hardware (for example, the memory 130, the display module 190, and/or the input/output module 140) by the control of the processor 120. Alternatively, the performance of a specific operation by the electronic device 101 may mean the performance of the specific operation by at least one hardware of the electronic device 101 according to execution of instructions stored in the memory 130.

According to various embodiments, the memory 130 may store various pieces of data used by at least one element of the electronic device 101 (for example, the processor 120, the input/output module 140, and/or the display module 190). The data may include, for example, software and input data or output data related thereto.

According to various embodiments, the input/output module 140 may receive commands or data to be used by the element (for example, the processor 120) of the electronic device 101 from the outside (for example, a user) of the electronic device 101. The input/output module 140 may include at least one of, for example, a microphone, a mouse, a keyboard, a key (for example, a button), or a digital pen (for example, a stylus pen). Meanwhile, the input/output module 140 may include a touch panel and a touch screen panel integrated circuit (TSP IC). In this case, the touch panel and the TSP IC may be implemented in an integrated structure with the display module 190 described below (for example, on-cell structure or in-cell structure) or may be disposed adjacent to the display module 190. The electronic device 101 may further include a sound output module (not shown). The sound output module may include, for example, a speaker or a receiver in which case a sound signal may be output to the outside of the electronic device 101. The speaker may be used for the general use such as multimedia reproduction or recording reproduction. The receiver may be used to receive an incoming call. According to an embodiment, the receiver may be implemented separately from the speaker or as a portion of the speaker.

The display module 190 may visually provide information to the outside (for example, the user) of the electronic device 101. The display module 190 may include, for example, a display, a hologram device, or a projector, and a control circuit for controlling the corresponding device. According to an embodiment, the display module 190 may be implemented integratively with the touch panel and the TSP IC as described above, and/or may be implemented to include a pressure sensor configured to measure the strength of force generated by a touch.

Meanwhile, although not illustrated, the electronic device 101 may further include a communication module (not shown) for communication with an external electronic device, but there is no limitation in the type of communication.

Figure 2:
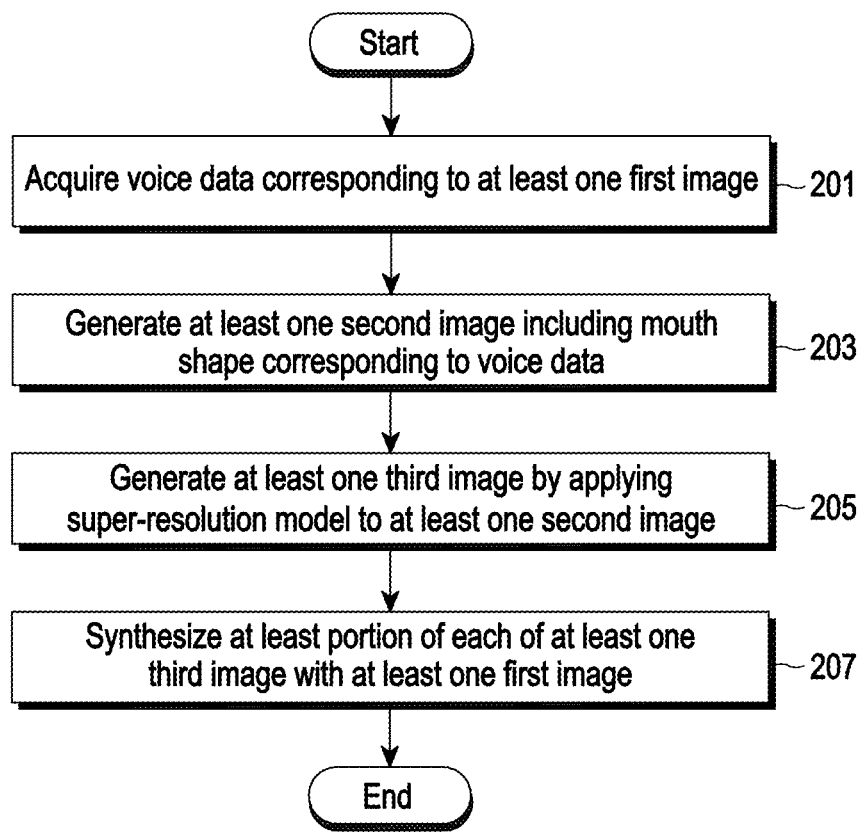
FIG. 2 is a flowchart illustrating a method of operating the electronic device according to various embodiments.
Figure 3:
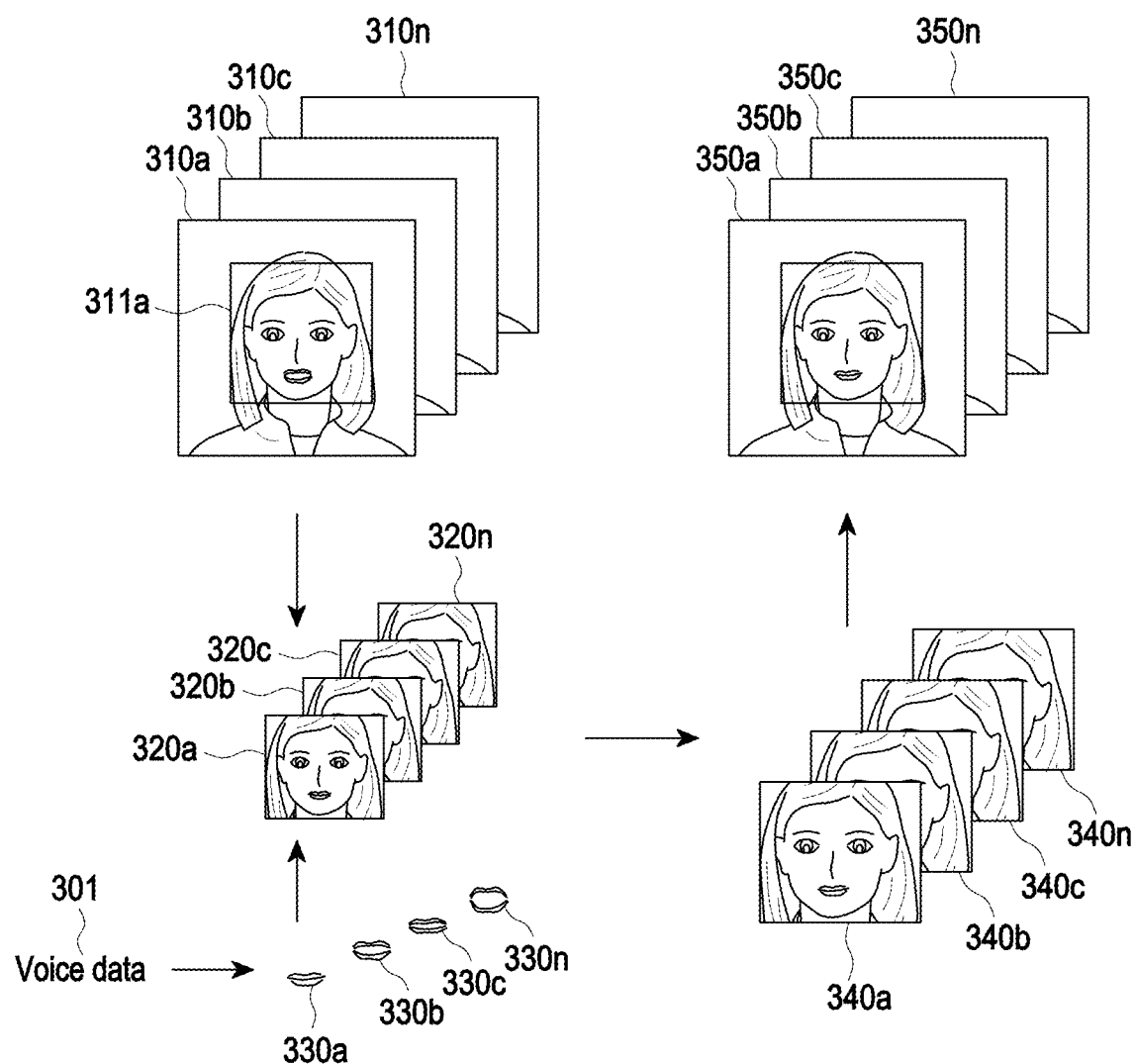
FIG. 3 illustrates a process of generating a video including generated mouth shapes according to various embodiments.

FIG. 2 is a flowchart illustrating a method of operating the electronic device according to various embodiments. The embodiment of FIG. 2 will be described with reference to FIG. 3. FIG. 3 illustrates a process of generating a video including mouth shapes according to various embodiments.

Referring to FIGS. 2 and 3 together, according to various embodiments, the electronic device 101 (for example, the processor 120) may acquire voice data 301 corresponding to at least one first image (for example, at least one first image 310*a*, 310*b*, 310*c*, and 310*n* in FIG. 3) in operation 201. The voice data 301 corresponding to at least one first image (for example, at least one first image 310*a*, 310*b*, 310*c*, and 310*n* in FIG. 3) may be voice data designated to be synthesized with at least one first image. That is, conventionally, the voice data 301 from at least one first image 310*a*, 310*b*, 310*c*, and 310*n* may be independent voice data, but the electronic device 101 may correlate the voice data 301, designated to be synthesized, with at least one first image 310*a*, 310*b*, 310*c*, and 310*n*, which may be named "voice data corresponding to the first image". Such a description may be applied to "voice data corresponding to at least one image" in various embodiments. In one example, at least one first image 310*a*, 310*b*, 310*c*, and 310*n* may be a plurality of frames included in a video. The electronic device 101 may load a video file stored in the memory 130. The video file may include original voice data different from voice data to be synthesized in FIG. 3 or may include no voice data. The original voice data may not be included in the video file after synthesis of the mouth shape, and the voice data 301 may be included in the video file after synthesis of the mouth shape. A video file including a plurality of frames may be received from another electronic device through the communication module or may be generated using a camera included in the electronic device 101. Alternatively, the electronic device 101 may generate a plurality of frames included in a video through an image generation algorithm (for example, an avatar generation algorithm), but there is no limitation in a method of acquiring the plurality of frames included in the video. In another example, the electronic device 101 may load one image rather than loading a plurality of images 310*a*, 310*b*, 310*c*, and 310*n* in FIG. 3. In this case, the electronic device 101 may generate a video having a plurality of frames by synthesizing a plurality of mouth shapes with one image multiple times, which will be described in more detail with reference to FIGS. 18A to 18C. At least one first image 310*a*, 310*b*, 310*c*, and 310*n* may be acquired by one of the acquisition operations or a combination of two or more of the acquisition operations. Meanwhile, although FIG. 3 illustrates that the number of first images 310*a*, 310*b*, 310*c*, and 310*n* is, for example, n, there is no limitation in the number of the first images. The number n may be a number of the applications of mouth shape candidates selected on the basis of one user selection or one conformity assessment result, but is only an example. It is assumed that the first images 310*a*, 310*b*, 310*c*, and 310*n* have, for example, a first resolution (for example, a resolution of 1920×1080). The first images 310*a*, 310*b*, 310*c*, and 310*n* may be called original images.

According to various embodiments, the electronic device 101 may acquire the voice data 301 for synthesis. Alternatively, the electronic device 101 may load the voice data 301 stored in the memory 130. For example, the electronic device 101 may acquire the voice data 301 through a microphone included in the input/output module 140 and store the same in the memory 130. In another example, the electronic device 101 may receive the voice data 301 from another electronic device through the communication module and store the same in the memory 130. In another example, the electronic device 101 may generate the voice data 301. The electronic device 101 may generate the voice data 301 by changing at least a portion of another piece of voice data. Alternatively, the electronic device 101 may synthesize the voice data 301 from text, but there is no limitation in a scheme for acquiring the voice data 301, and the voice data 301 may be acquired by one of the acquisition operations or a combination of two or more of the acquisition operations.

Referring to FIGS. 2 and 3 together again, the electronic device 101 may generate at least one second image including mouth shapes 330a, 330b, 330c, and 330n corresponding to the voice data 301 in operation 203. For example, the electronic device 101 may extract a face area 311a from the first image 310 which is the original image. Although FIG. 3 illustrates that the face area 311a is extracted from only the first image 310a for convenience of description, it is only for convenience of description and the face area may also be extracted from each of the remaining first images 310b, 310c, and 310n. There is no limitation in a model (or algorithm) for recognizing and/or extracting the face area. The extracted face area 311a may be mapped to person identification information and managed. For example, a plurality of people may be included in one image, in which case the electronic device 101 may detect a plurality of faces in the image, and the plurality of faces may be mapped to a plurality of pieces of person identification information, respectively, and managed. The electronic device 101 may independently perform operations of mouth shape synthesis described below for each piece of person identification information. Meanwhile, since there is a possibility of incorrectly classifying the face area, the electronic device 101 may provide a user interface capable of modifying the result of face classification.

In one example, the electronic device 101 may generate a low-resolution image having a second resolution (for example, a resolution of 100×100) by down-sampling the extracted face area 311a. The second resolution of the low-resolution image may be configured on the basis of, for example, the resolution of the mouth shapes 330a, 330b, 330c, and 330n, but there is no limitation. In the example of FIG. 3, the resolution of the face area 311a is higher than, for example, the second resolution, and the low-resolution image having the second resolution corresponding to the mouth shapes 330a, 330b, 330c, and 330n may be generated through down-sampling. Alternatively, when the resolution of the face area 311a is lower than the second resolution, the electronic device 101 may generate the low-resolution image having the second resolution by up-sampling the extracted face area 311a. In another example, the electronic device 101 may use the extracted face area 311a without down-sampling.

The electronic device 101 may generate at least one mouth shape 330a, 330b, 330c, and 330n by using the voice data 301. For example, the voice data 301 may be expressed in the form of a voice waveform of which amplitude varies in time series. At least one mouth shape 330a, 330b, 330c, and 330n may correspond to a voice varying in time series. The electronic device 101 may identify a mouth shape key point from the voice data 301. For example, the electronic device 101 may extract a mel frequency cepstral coefficient (MFCC) from the voice data 301. The electronic device 101 may identify a principal component analysis (PCA) coefficient from the extracted MFCC by using an artificial model (for example, a long short term memory (LSTM)-based model) and identify a mouth shape key point on the basis of the PCA coefficient. The mouth shape key point may be implemented as, for example, a feature point or mesh information. The electronic device 101 may generate mouth shapes 330a, 330b, 330c, and 330n by applying the identified mouth shape key point to the artificial model (for example, GAN-based model). The GAN-based model may be a model trained to prevent a discriminator from discriminating an image generated by a generator and may include, for example, a Pix2pix model or a wav2lip-based model, but there is no limitation in the type of a model for generating a mouth shape. Meanwhile, the GAN-based model is only an example, and it may be understood by those skilled in the art that there is no limitation in the type of an artificial neural network that is the base of the artificial intelligence model for generating the mouth shape.

Meanwhile, FIG. 3 illustrates that the electronic device 101 generates only mouth shapes 330a, 330b, 330c, and 330n, but it is only an example. The electronic device 101 may generate a plurality of shapes of lower parts of faces corresponding to the voice data 301 on the basis of an artificial intelligence model for generating the lower part of the face including the mouth shape. Alternatively, the electronic device 101 may generate a jaw shape and/or a shape of an area around the mouth separately from the mouth shape, which may be used for synthesis with the mouth shape. The "mouth shape" in the disclosure may mean only a mouth shape or may also include another area (for example, a jaw or an area around the mouth) as well as the mouth shape. For example, the "mouth shape" may be an "area including a mouth shape". It is illustrated that the number of mouth shapes 330a, 330b, 330c, and 330n is the same as the number of original images, but it is only an example, and at least some of the mouth shapes may be overlappingly used in a plurality of images in which case the number of mouth shapes 330a, 330b, 330c, and 330n may be smaller than the number of original images. The electronic device 101 may generate a second image 320a by synthesizing the mouth shape 330a with the low-resolution image corresponding to the face area 311a of the first image 310a. According to the same process, the electronic device 101 may generate second images 320b, 320c, and 320n by synthesizing low-resolution areas corresponding to the face areas in the first images 310b, 310c, and 310n with the mouth shapes 330b, 330c, and 330n, respectively. At least one second images 320a, 320b, 320c, and 320n may have the second resolution (for example, the resolution of 100×100).

Meanwhile, in the example of FIG. 3, one mouth shape 330a corresponds to one face area 311a (or down-sampled image). The electronic device 101 according to various embodiments may generate a plurality of mouth shape candidates for one face area 311a (or down-sampled image) and select one mouth shape candidate from the plurality of mouth shape candidates. The mouth shape 330a in FIG. 3 may be one selected from the plurality of mouth shape candidates for the face area 311a (or down-sampled image). The other mouth shape 330b, 330c, or 330n may also be one selected from the plurality of candidates. Generation and selection of the plurality of candidates are described with reference to FIGS. 4 and 5. Meanwhile, in another embodiment, the electronic device 101 may be implemented to generate one mouth shape 330a immediately without generating the plurality of candidates for the face area 311a (or down-sampled image).

Referring to FIGS. 2 and 3 together again, according to various embodiments, the electronic device 101 may generate at least one third images 340a, 340b, 340c, and 340n by applying a super-resolution model to each of at least one second image 320a, 320b, 320c, and 320n in operation 205. The super-resolution model may include, for example, a single image super resolution (SISR)-based model and/or a multi image super resolution (MISR)-based model, but there is no limitation in the type of the super-resolution model. In one embodiment, the electronic device 101 may divide the second image 320a which is one low-resolution image into a plurality of areas, apply different super-resolution models to the divided areas to acquire a plurality of high-resolution areas, and synthesize the plurality of high-resolution areas to generate the third image 340a which is one high-resolution image. This is described in more detail with reference to FIGS. 13 and 14. In another embodiment, the electronic device 101 may generate the third image 340a which is one high-resolution image by applying one super-resolution model to the second image 320a which is one low-resolution image. The high-resolution images 340a, 340b, 340c, and 340n may have a third resolution. The third resolution has no limitation if it is higher than the second resolution. In one example, the third resolution may have the same resolution as or a different resolution from the face area 311a of the first image 310a which is the original image.

Referring to FIGS. 2 and 3 together again, according to various embodiments, the electronic device 101 may synthesize at least some of the at least one third image 340a, 340b, 340c, and 340n with at least one first image 310a, 310b, 310c, and 310n in operation 207. In one embodiment, the electronic device 101 may synthesize only some areas of the third image 340a rather than the entire areas of the third image 340a with the first image 310a which is the original image. When the entire face is synthesized, there may be a possibility of being unnatural, and thus the electronic device 101 may extract an area of the lower part of the face from the third image 340a and synthesize only the corresponding area with the first image 310a, which will be described in more detail with reference to FIGS. 15 and 16. In another embodiment, the electronic device 101 may synthesize the entire third image 340a with the first image 310a. Meanwhile, when at least one third image 340a, 340b, 340c, and 340n have substantially the same resolution as the face area (for example, 311a) in at least one first image 310a, 310b, 310c, and 310n, the electronic device 101 may synthesize at least some of the at least one third image 340a, 340b, 340c, and 340n with at least one first image 310a, 310b, 310c, and 310n, but may synthesize the result of down-sampling after the application of the super-resolution model according to implementation. Alternatively, when at least one third image 340a, 340b, 340c, and 340n have substantially different resolutions from the face area (for example, 311a) in at least one first image 310a, 310b, 310c, and 310n, the electronic device 101 may control the resolution of at least some of the at least one third image 340a, 340b, 340c, and 340n and then synthesize the same with at least one first image 310a, 310b, 310c, and 310n.

According to the above description, the electronic device 101 may generate at least one image 350a, 350b, 350c, and 350n in which the mouth shapes 330a, 330b, 330c, and 330n varying in time series according to the voice data 301 are synthesized. The electronic device 101 may map at least one synthesized image 350a, 350b, 350c, and 350n to the voice data 301 and store the same, for example, in the form of a single video file, but there is no limitation in a file format. In one example, only the voice data 301 may be mapped to at least one synthesized image 350a, 350b, 350c, and 350n and stored. In another example, voice data obtained by synthesizing the voice data 301 and additional voice data (not shown) may be mapped to at least one synthesized image 350a, 350b, 350c, and 350n and stored. For example, the additional voice data (not shown) may be at least some of the voice data included in the original video file. When voice data corresponding to the speech is included in the original video file during a time period in which the mouth shapes 330a, 330b, 330c, and 330n changed in time series, additional voice data (not shown) may be voice data (for example, called a background sound) excluding the voice data corresponding to the speech from the voice data of the original video. When voice data corresponding to the speech is not included in the original video file during the time at which the mouth shapes 330a, 330b, 330c, and 330n changed in time series, the original voice data may be used as additional voice data. When synthesizing the voice data 301 and the additional voice data (not shown), the electronic device 101 may perform additional processing (for example, control an amplitude of the additional voice data (not shown). In the disclosure, it may be understood by those skilled in that art that correlation storage between the voice data 301 and images may be correlation storage between only the voice data 301 used for generating mouth shapes and the images or correlation storage between the voice data 301 used for generating mouth shapes and images of the additional voice data. The voice data 301 may be temporally synchronized with at least one synthesized image 350a, 350b, 350c, and 350n. The electronic device 101 may reproduce a video file in the future and sequentially display at least one synthesized image 350a, 350b, 350c, and 350n, and output the temporally synchronized voice data 301. Accordingly, the user may view a video as if a person in the original image speaks the voice data 301. Meanwhile, it has been described that the voice data 301 includes only voice data corresponding to the speech for the generation of the mouth shape, but is only an example. The voice data 301 may include only voice data corresponding to the speech or may include voice data corresponding to the speech and voice data including a background sound.

In various embodiments, the electronic device 101 may store a video having synthesized mouth shapes and output the same through an output device (for example, a display module and/or a speaker) according to a reproduction request. Alternatively, the electronic device 101 may transmit the synthesized video according to a request from an external device. For example, the external device may be a client device subscribed to a video on demand (VOD) service in a subscription type, and the electronic device 101 may be implemented as a server. The electronic device 101 may transmit a synthesized video according to provision of a VOD from the client device. Alternatively, the electronic device 101 may be implemented to provide a streaming service and transmit a synthesized video according to a request from an external device. For example, the electronic device 101 may provide a video synthesized with mouth shapes corresponding to a reproduction request language, which will be described in more detail with reference to FIG. 20. Alternatively, the electronic device 101 may be implemented as a server providing a general video file, and when a request for a mouth shape-synthesized video is identified (for example, a request according to designation of an icon provided by the client device) while the general video file is provided, the electronic device 101 may configure provision of a video synthesized in accordance therewith, and there is no limitation in a scheme for providing the synthesized video.

Meanwhile, sequences of the operations illustrated in the flowchart of FIG. 2 and flowcharts described herein are not limited to the illustration and may be changed. Two or more operations may be performed substantially simultaneously (or in parallel). Between adjacent operations, before the first operation, or after the last operation, another operation may be additionally performed. At least some of the illustrated operations may be omitted.

Figure 4:
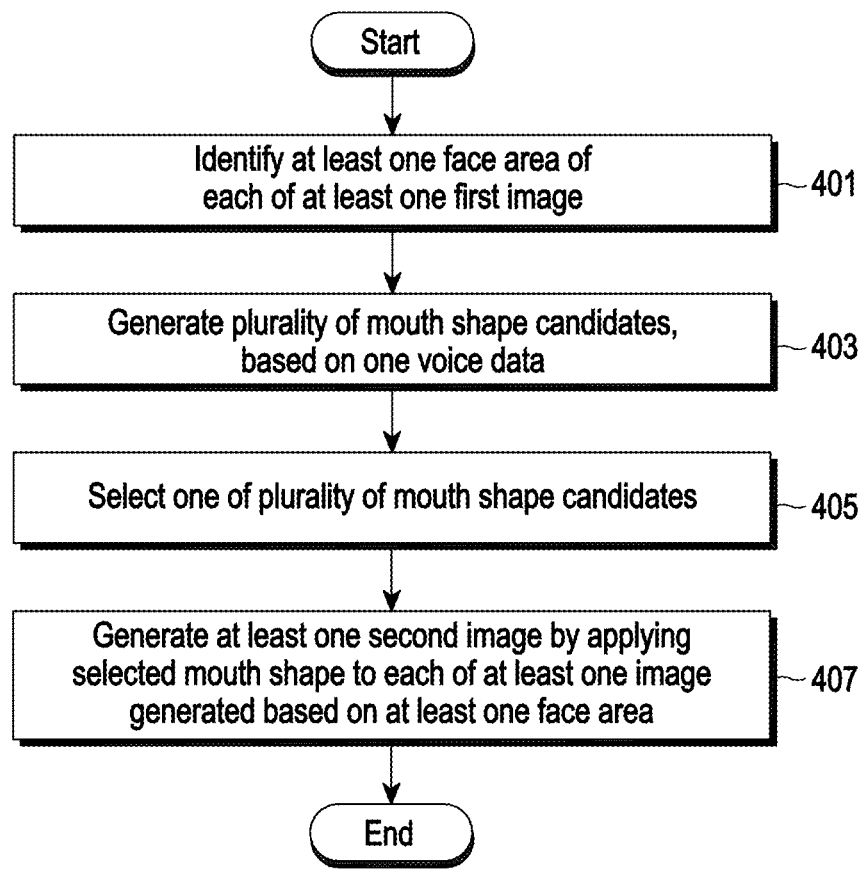
FIG. 4 is a flowchart illustrating a method of operating the electronic device according to various embodiments.
Figure 5:
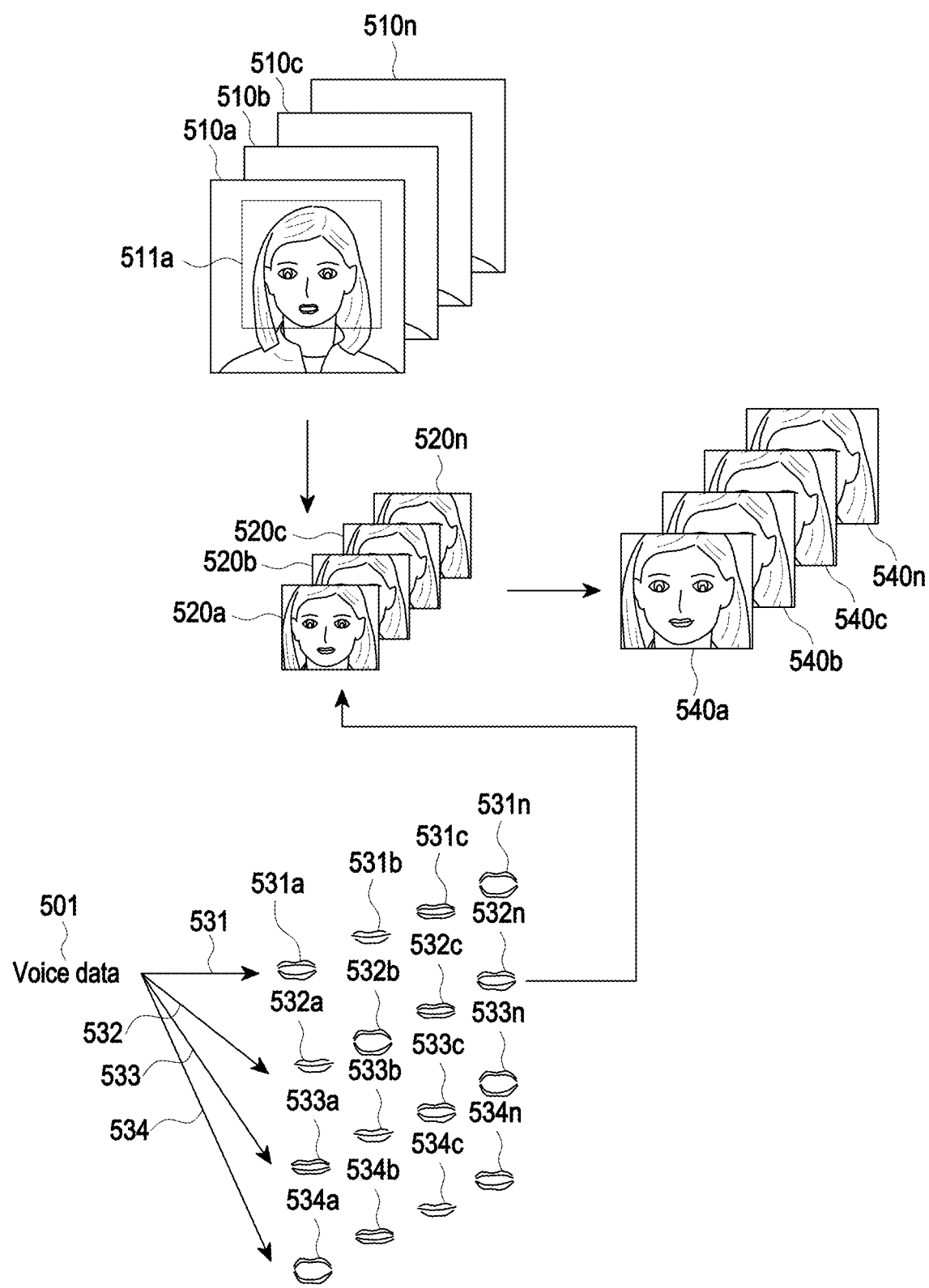
FIG. 5 illustrates a process of selecting one of a plurality of mouth shape candidates according to various embodiments.

FIG. 4 is a flowchart illustrating a method of operating the electronic device according to various embodiments. The embodiment of FIG. 4 is described with reference to FIG. 5. FIG. 5 illustrates a process of selecting one of a plurality of mouth shape candidates according to various embodiments. In a description of the present embodiment and the following embodiments, the part described with reference to FIGS. 2 and 3 is briefly described or is omitted.

Referring to FIGS. 4 and 5 together, according to various embodiments, the electronic device 101 (for example, the processor 120) may identify at least one face area in each of at least one first image 510a, 510b, 510c, and 510n, for example, a face area 511a in a first image 510a (other face areas in the first images 510b, 510c, and 510n are omitted for convenience of description) in operation 401. As described above, the electronic device 101 may generate at least one low-resolution image by using at least one face area in at least one first image 510a, 510b, 510c, and 510n (for example, through down-sampling or up-sampling, or without any sampling).

According to various embodiments, the electronic device 101 may generate a plurality of mouth shape candidates 531, 532, 533, and 534 on the basis of one voice data 501 in operation 403. The mouth shape candidates may include a plurality of mouth shapes having sequences in time series. For example, the first mouth shape candidate 531 may include a mouth shape 531a corresponding to a first time point, a mouth shape 531b corresponding to a second time point, a mouth shape 531c corresponding to a third time point, and a mouth shape 531d corresponding to a fourth time point. The second mouth shape candidate 532 may include a mouth shape 532a corresponding to a first time point, a mouth shape 532b corresponding to a second time point, a mouth shape 532c corresponding to a third time point, and a mouth shape 532d corresponding to a fourth time point. That is, the first mouth shape candidate 531 and the second mouth shape candidate 532 may include a plurality of mouth shapes corresponding to the same time period of the voice data 501. The third mouth shape candidate 533 and the fourth mouth shape candidate 534 may also include mouth shapes 533a and 534a corresponding to a first time point, mouth shapes 533b and 534b corresponding to a second time point, mouth shapes 533c and 534c corresponding to a third time point, and mouth shapes 533d and 534d corresponding to a fourth time point. In one embodiment, the electronic device 101 may process one voice data 501 in a plurality of schemes to generate a plurality of input values and input the generated original voice data 501 and each of the plurality of input values into an artificial intelligence model for generating mouth shapes to generate the plurality of mouth shape candidates 531, 532, 533, and 534, which will be described in more detail with reference to FIGS. 6 and 7. In another embodiment, the electronic device 101 may input one voice data 501 into an artificial intelligence model for generating a plurality of mouth shapes to generate a plurality of mouth shape candidates 531, 532, 533, and 534, which will be described in more detail with reference to FIGS. 8 and 9. Meanwhile, the plurality of mouth shape candidates 531, 532, 533, and 534 may include at least one mouth shape different from each other.

According to various embodiments, the electronic device 101 may select one of the plurality of mouth shape candidates 531, 532, 533, and 534 in operation 405. In the example of FIG. 5, it is assumed that the electronic device 101 selects the second mouth shape candidate 532. In one example, the electronic device 101 may select one of the plurality of mouth shape candidates 531, 532, 533, and 534 on the basis of a user input, which will be described in more detail with reference to FIGS. 10 and 11A to 11F. Alternatively, the electronic device 101 may select one of the plurality of mouth shape candidates 531, 532, 533, and 534 without a user input. The electronic device 101 may select one of the plurality of mouth shape candidates 531, 532, 533, and 534 by using, for example, a mouth shape assessment model, which will be described in more detail with reference to FIG. 12A.

According to various embodiments, the electronic device 101 may generate at least one second image 520a, 520b, 520c, and 520n by applying the selected mouth shape 532 to each of the at least one image generated on the basis of at least one face area, for example, the low-resolution images in operation 407. The electronic device 101 may generate at least one second image 520a, 520b, 520c, and 520n by synthesizing the mouth shapes 532a, 532b, 532c, and 532n at respective time points included in the selected mouth shape 532 with at least one image generated on the basis of the face areas in at least one first image 510a, 510b, 510c, and 510n, respectively. Thereafter, the electronic device 101 may generate at least one third image 540a, 540b, 540c, and 540n by applying super-resolution models to at least one second image 520a, 520b, 520c, and 520n. Although not illustrated, the electronic device 101 may synthesize at least a portion of each of the at least one third image 540a, 540b, 540c, and 540n with at least one first image 510a, 510b, 510c, and 510n which are the original images to generate a video file with which the mouth shapes are synthesized.

Meanwhile, selecting one of the plurality of mouth shape candidates by the electronic device 101 before the application of super-resolution models to the low-resolution images with which the mouth shapes are synthesized, for example, at least one second image 520a, 520b, 520c, and 520n is only an example. In one alternative embodiment, the electronic device 101 may perform the selection after generating at least one low-resolution image. For example, the electronic device 101 may generate a plurality of low-resolution image candidates including the plurality of mouth shape candidates 531, 532, 533, and 534. For example, at least one second image 520a, 520b, 520c, and 520n in FIG. 5 may be candidates among a plurality of low-resolution image candidates. The plurality of low-resolution image candidates may include the plurality of mouth shape candidates 531, 532, 533, and 534, and the electronic device 101 may select one of the plurality of low-resolution image candidates on the basis of a user input or an assessment result of an assessment model.

Alternatively, in another alterative embodiment, the selection may be performed after at least one high-resolution image is generated. For example, the electronic device 101 may generate a plurality of low-resolution images with which the plurality of mouth shape candidates 531, 532, 533, and 534 are synthesized. The plurality of low-resolution images may include the plurality of mouth shape candidates 531, 532, 533, and 534. For example, at least one second image 520a, 520b, 520c, and 520n in FIG. 5 may be one image set of the plurality of low-resolution images. The electronic device 101 may apply the super-resolution model to each of the plurality of low-resolution image candidates. The electronic device 101 may generate a plurality of high-resolution image candidates. For example, at least one third image 540a, 540b, 540c, and 540n in FIG. 5 may be candidates among the plurality of high-resolution image candidates. The electronic device 101 may select one of the plurality of high-resolution image candidates on the basis of a user input or an assessment result of an assessment model.

Alternatively, in another alternative embodiment, the electronic device 101 may synthesize at least one high-resolution image with at least one original image and then select one high-resolution image. For example, the electronic device 101 may generate a plurality of low-resolution images with which the plurality of mouth shape candidates 531, 532, 533, and 534 are synthesized. The plurality of low-resolution images may include the plurality of mouth shape candidates 531, 532, 533, and 534. For example, at least one second image 520a, 520b, 520c, and 520n in FIG. 5 may be one image set of the plurality of low-resolution images. The electronic device 101 may apply the super-resolution model to each of the plurality of low-resolution images. The electronic device 101 may generate a plurality of high-resolution images. For example, at least one third image 540a, 540b, 540c, and 540n in FIG. 5 may be images among the plurality of high-resolution images. The electronic device 101 may synthesize the plurality of high-resolution images with at least one original image, and accordingly, a plurality of completely synthesized image candidates may be generated. For example, at least one fourth image 350a, 350b, 350c, and 350n in FIG. 3 may be candidates among the plurality of completely synthesized image candidates. The electronic device 101 may select one of the plurality of completely synthesized image candidates on the basis of a user input or an assessment result of an assessment model. As described above, there is no limitation in a time point at which one of the candidates is selected.

Figure 6:
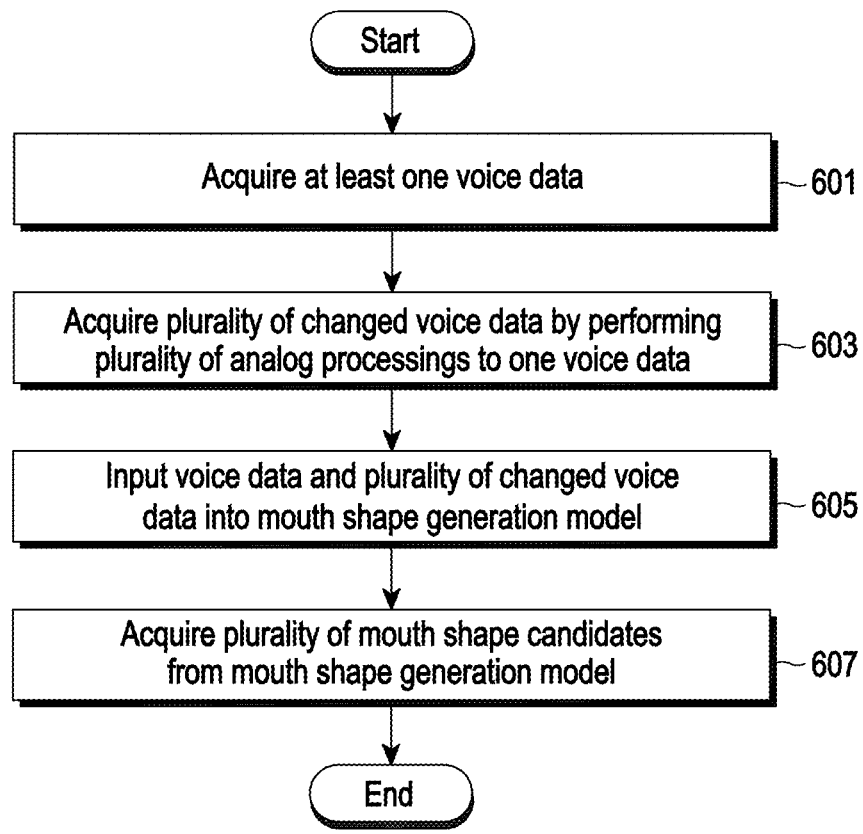
FIG. 6 is a flowchart illustrating a method of operating the electronic device according to various embodiments.
Figure 7:
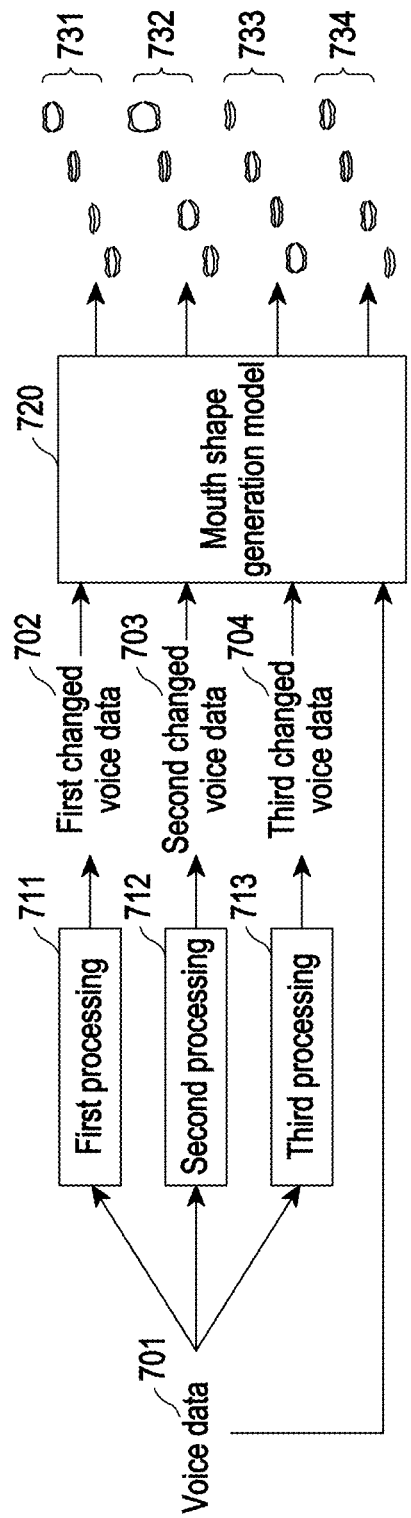
FIG. 7 illustrates a process of generating a plurality of mouth shape candidates according to various embodiments.

FIG. 6 is a flowchart illustrating a method of operating the electronic device according to various embodiments. The embodiment of FIG. 6 will be described with reference to FIG. 7. FIG. 7 illustrates a process of generating a plurality of mouth shape candidates according to various embodiments.

Referring to FIGS. 6 and 7 together, according to various embodiments, the electronic device 101 (for example, the processor 120) may acquire one voice data 701 in operation 601. The electronic device 101 may acquire a plurality of pieces of changed voice data 702, 703, and 704 by performing a plurality of analog processings 711, 712, and 713 on one voice data in operation 603. As described above, the voice data 701 may be expressed as a voice waveform or may be converted into a voice waveform. The analog processings 711, 712, and 713 may include the control (decrease or increase) of an amplitude for a voice waveform. There is no limitation in a degree of the control of the amplitude. Further, the analog processings may be divided according to the degree of the control, and may be divided as, for example, different analog processings such as an increase of 1.5 times or 1.8 times. The analog processings 711, 712, and 713 may include the control of a reproduction speed of a voice waveform. There is no limitation in a degree of the control of the reproduction speed. Further, the analog processings may be divided according to the degree of the control, and may be divided as, for example, different analog processings such as an increase of 1.5 times or 1.8 times. The analog processings 711, 712, and 713 may include noise addition or noise reduction (or suppression) for a voice waveform. There is no limitation in noise, and the analog processings may be divided according to the type of noise, and, for example, addition of first noise and addition of second noise different from the first noise may be separated as different analog processings. The analog processings 711, 712, and 713 may include separation of a background sound from a voice waveform. There is no limitation in the type of a background sound and/or the size of a background sound, and the analog processings may be divided according to the type of the background sound and/or the size of the background sound. Meanwhile, the analog processings 711, 712, and 713 may include spectrum conversion for a relatively soft voice as well as the above-described schemes, and there is no limitation in the type thereof, and the analog processings 711, 712, and 713 may be named filters.

The electronic device 101 according to various embodiments may input voice data 701 and each of a plurality of pieces of changed voice data 702, 703, and 704 into a mouth shape generation model 720 in operation 605. In operation 607, the electronic device 101 may acquire each of a plurality of mouth shape candidates 731, 732, 733, and 734 from the mouth shape generation model 720. The mouth shape generation model 720 may receive the plurality of pieces of changed voice data 702, 703, and 704 sequentially or simultaneously, and output the mouth shape candidates 731, 732, 733, and 734 which are the output values sequentially or simultaneously. The mouth shape candidates 731, 732, 733, and 734 may include mouth shapes which are at least partially different from each other, which results from the at least partially different input values (for example, 701, 702, 703, and 704). For example, it is assumed that the second processing 712 is an increase in an amplitude for a voice waveform. The mouth shape generation model 720 may receive second changed voice data 703 based on the second processing 712 and output a second mouth shape candidate 732 corresponding to the second changed voice data 703. The mouth shape generation model 720 may receive the original voice data 701 and output a fourth mouth shape candidate 734 corresponding to the original voice data 701. The mouth shape generation model 720 may be trained to output, for example, a shape of the mouth opened relatively wider for a voice waveform having a relatively large amplitude. In this case, each of the mouth shapes included in the second mouth shape candidate 732 may have a shape of the mouth opened relatively wider compared to the fourth mouth shape candidate 734. As described above, according to the generation of a plurality of input values by one mouth shape generation model 720, the plurality of mouth shape candidates 731, 732, 733, and 734 may be generated.

Thereafter, as described with reference to FIGS. 4 and 5, one of the plurality of mouth shape candidates 731, 732, 733, and 734 may be selected. For example, when the user selects a mouth shape, the user may select the most natural mouth shape from among the plurality of mouth shape candidates 731, 732, 733, and 734, which will be described in more detail with reference to FIGS. 10 and 11A to 11F. For example, when the electronic device 101 selects a mouth shape through an assessment model, the user may select a mouth shape having the highest score related to the assessment result among the plurality of mouth shape candidates 731, 732, 733, and 734, which will be described in more detail with reference to FIG. 12A. Accordingly, it is possible to generate a more natural mouth shape compared to the existing mouth shape synthesis technology for outputting only one result according to one mouth shape generation model 720.

Figure 8:
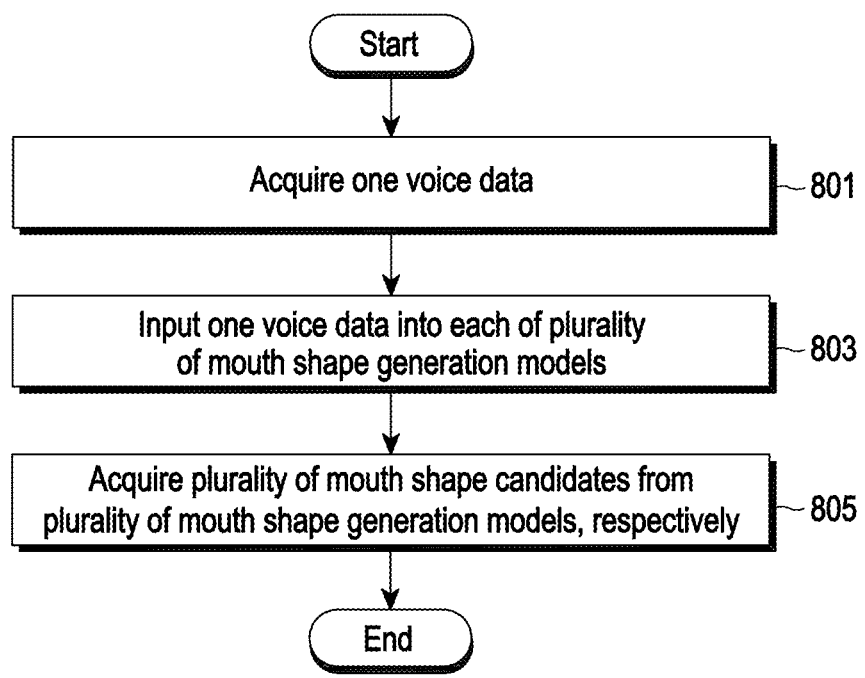
FIG. 8 is a flowchart illustrating a method of operating the electronic device according to various embodiments.
Figure 9:
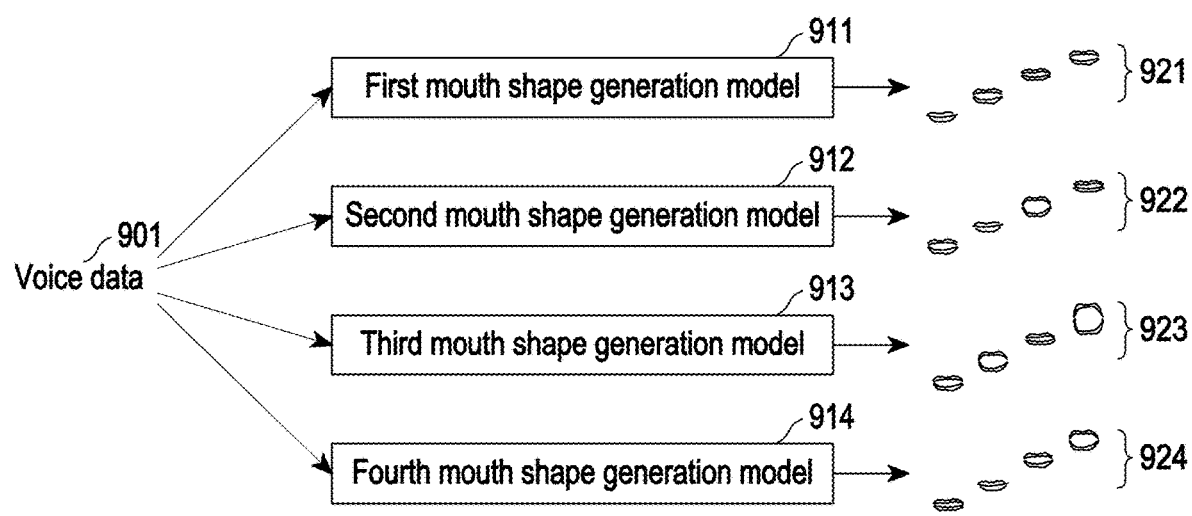
FIG. 9 illustrates a process of generating a plurality of mouth shape candidates according to various embodiments.

FIG. 8 is a flowchart illustrating a method of operating the electronic device according to various embodiments. The embodiment of FIG. 8 is described with reference to FIG. 9. FIG. 9 illustrates a process of generating a plurality of mouth shape candidates according to various embodiments.

Referring to FIGS. 8 and 9 together, according to various embodiments, the electronic device 101 (for example, the processor 120) may acquire one voice data 901 in operation 801. The electronic device 101 may input one voice data 901 into each of a plurality of mouth shape generation models 911, 912, 913, and 914 in operation 803. The electronic device 101 may acquire a plurality of mouth shape candidates 921, 922, 923, and 924 from the plurality of mouth shape generation models 911, 912, 913, and 914 in operation 805. For example, the plurality of mouth shape generation models 911, 912, 913, and 914 may be acquired according to training results using different training data. In one example, the first mouth shape generation model 911 may be a model acquired according to the training result using training data of a first language (for example, Korean), and the second mouth shape generation model 912 may be a model acquired according to the training result using training data of a second language (for example, English). When training is performed using different training data for the same neural network structure, different mouth shape generation models may be generated. Although the voice data 901 of the first language is input into the second mouth shape generation model 912 trained according to the second language, a second mouth shape candidate 922 corresponding to the corresponding voice data 901 may be generated. The second mouth shape candidate 922 may be different from the first mouth shape candidate 921 and may be more natural according to occasions. In another example, the third mouth shape generation model 913 may be a model acquired according to the training result using training data of a first emotion (for example, pleasure), and the fourth mouth shape generation model 914 may be a model acquired according to the training result using training data of a second emotion (for example, fury). The third mouth shape candidate 923 may be output from, for example, the third mouth shape generation model 913 learned on the basis of the first emotion and thus may have the form of imitating the mouth shape of the first emotion. The fourth mouth shape candidate 924 may be output from, for example, the fourth mouth shape generation model 914 learned on the basis of the second emotion and thus may have the form of imitating the mouth shape of the second emotion. Accordingly, the fourth mouth shape candidate 924 may be different from the third mouth shape candidate 923. Meanwhile, as illustrated in FIG. 9, some mouth shape generation models are models trained on the basis of different language training data, which is simply for a description, and it may be understood by those skilled in the art that there is no limitation if the models are models of different parameter and/or different neural network structures. For example, the models may include a model trained according to a racial characteristic (for example, characteristic of white, black, and brown) or a model trained according to a genre characteristic (live-action movie, 3D animation, and 2D animation). The operations (calculations) based on the mouth shape generation models 911, 912, 913, and 914 may be performed at least partially simultaneously or sequentially. The mouth shape candidates 921, 922, 923, and 924 may include at least partially different mouth shapes, which may result from at least partially different mouth shape generation models 911, 912, 913, and 914. Thereafter, as described with reference to FIGS. 4 and 5, one of the plurality of mouth shape candidates 921, 922, 923, and 924 may be selected. Accordingly, it is possible to generate a more natural mouth shape compared to the existing mouth shape synthesis technology for outputting only one result according to one mouth shape generation model 720.

According to various embodiments, the electronic device 101 may perform analog-processing on voice data to generate a plurality of input values and input the plurality of generated input values into a plurality of models. For example, it is assumed that the electronic device 101 stores four models and analog processing schemes are two. In this case, the electronic device 101 may generate a total of three input values for original voice data and two pieces of analog processed-voice data. The electronic device 101 may input a total of three input values into four models. Accordingly, the electronic device 101 may generate twelve mouth shape candidates.

Figure 10:
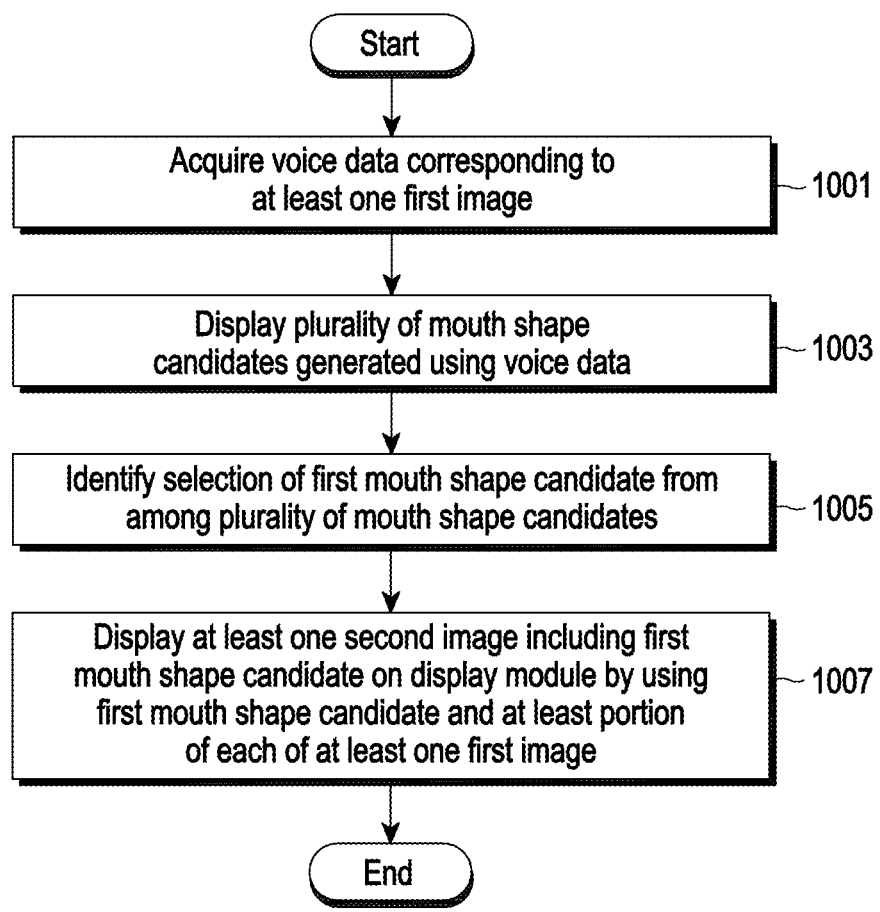
FIG. 10 is a flowchart illustrating a method of operating the electronic device according to various embodiments.

FIG. 10 is a flowchart illustrating a method of operating the electronic device according to various embodiments. The embodiment of FIG. 10 is described with reference to FIGS. 11A to 11F. FIGS. 11A to 11F illustrate a process of generating a plurality of mouth shape candidates according to various embodiments.

Figure 11A:
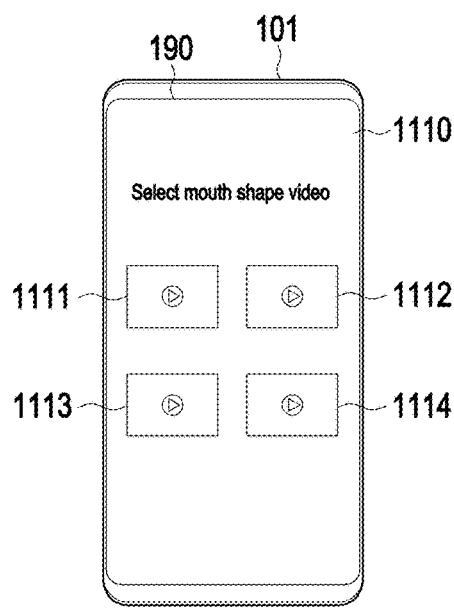
FIGS. 11A to 11G illustrate a process of generating a plurality of mouth shape candidates according to various embodiments.
Figure 11B:
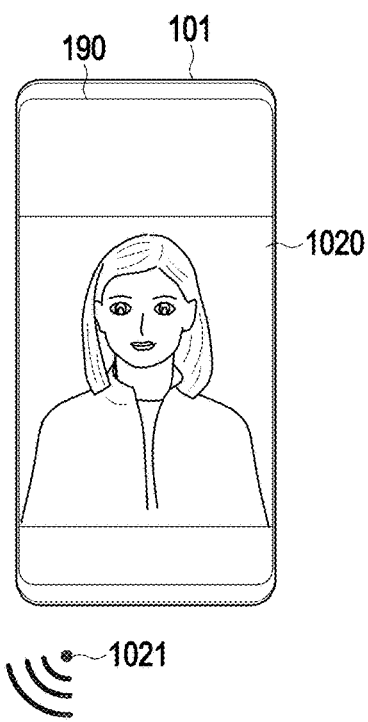

Referring to FIG. 10, according to various embodiments, the electronic device 101 (for example, the processor 120) may acquire voice data corresponding to at least one first image in operation 1001. At least one first image may be at least one original image described above. For example, as illustrated in FIG. 11A, the electronic device 101 may display at least one icon (or thumbnail) 1111, 1112, 1113, and 1114 for reproducing at least one video file on the display module 190. The electronic device 101 may select a video file with which voice data is synthesized among at least one video file. For example, the electronic device 101 may identify a user input (for example, a touch input or a voice input for an icon) for one of at least one icon 1111, 1112, 1113, and 1114 and may select a video file to be synthesized on the basis of the user input. For example, when the first icon 1111 is selected, the electronic device 101 may sequentially display at least one first image included in the corresponding video file on the display module 190 as illustrated in FIG. 11B. The first image 1020 may be one of at least one first image included in the corresponding video file. The electronic device 101 may output a voice 1021 corresponding to voice data included in the corresponding video file through the input/output module 140. In one example, the electronic device 101 may synthesize voice data in all of the video file reproduction sections. Alternatively, the electronic device 101 may identify a reproduction section with which the voice data is synthesized while the video file is reproduced on the basis of the user input. In one example, the electronic device 101 may identify a first touch input through the input/output module 140 (for example, a touch panel) during video reproduction and may identify a second touch input after reproduction is performed for a predetermined time. In this case, the electronic device 101 may identify a section from a first reproduction time point at which the first touch input is identified to a second reproduction time point at which the second touch input is identified as a reproduction section with which voice data is synthesized. In another example, the electronic device 101 may display a progress bar and at least one control object located on the progress bar. The at least one control object may be moved through, for example, a user input (for example, a touch input on the control objects). The user may control a user input for moving at least one control object in order to configure a desired specific reproduction section as a voice data synthesis section. Meanwhile, it is understood by those skilled in the art that there is no limitation in a scheme for configuring a reproduction section to be synthesized among all reproduction sections of the video file.

According to various embodiments, the electronic device 101 may select one of a plurality of mouth shape candidates for each of a plurality of time sections in one video file. For example, for a first time section of one video file, the electronic device 101 may select a plurality of first mouth shape candidates corresponding to voice data to be synthesized for the first time section and select one of the plurality of first mouth shape candidates. Further, for a second time section of the one video file, the electronic device 101 may select a plurality of second mouth shape candidates corresponding to voice data to be synthesized for the second time section and select one of the plurality of second mouth shape candidates. The second time section may be a time section consecutive to the first time section or separated therefrom.

Figure 11C:
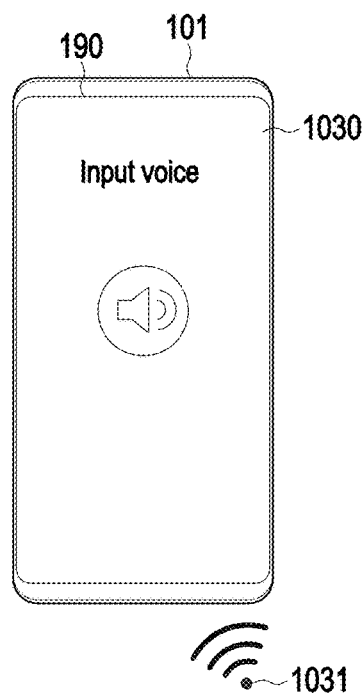
Figure 11D:
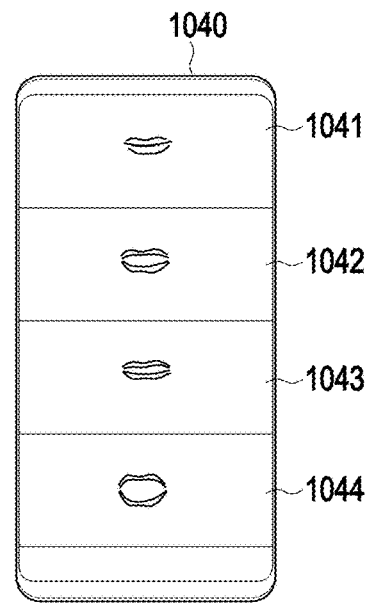
Figure 11E:
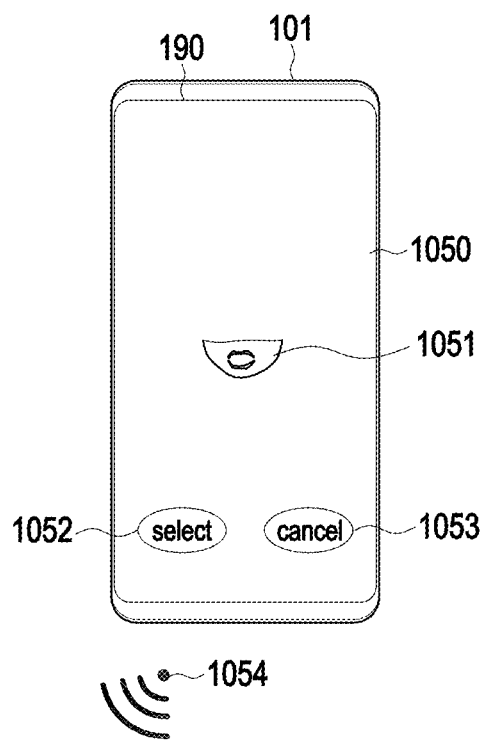

According to various embodiments, the electronic device 101 may display a plurality of mouth space candidates generated using voice data in operation 1003. For example, as illustrated in FIG. 11C, the electronic device 101 may display a screen 1030 making a request for a voice input. For example, the electronic device 101 may provide a video such as the best scene of a movie. For example, the video provided in FIG. 11B may be a video such as the best scene of a movie. When recording of a voice to be synthesized with a video is requested (for example, designation of a button for performing recording is identified), the electronic device 101 may display the screen 1030 making a request for a voice input. According to the identification of the corresponding screen 1030, the user may speak a voice 1031 to be synthesized, and the electronic device 101 may convert the voice 1031 received through the input/output module 140 into voice data. Accordingly, as the voice directly input by the user is synthesized with the best scene of the existing movie, a meme video with which a mouth shape is also synthesized according to the corresponding voice may be generated. For example, in the meme video, an image of the best scene in the existing movie is reproduced, but a voice directly synthesized by the user may be reproduced. The electronic device 101 may generate a plurality of mouth shape candidates by using voice data. As described above, the electronic device 101 may perform at least one analog processing on one voice data to generate a plurality of input values and input the plurality of generated input values into one mouth shape generation model, so as to generate a plurality of mouth shape candidates. Alternatively, the electronic device 101 may input voice data into each of the plurality of generated mouth shape generation models to generate a plurality of mouth shape candidates. The electronic device 101 may display a plurality of still images 1041, 1042, 1043, and 1044 corresponding to the plurality of generated mouth shape candidates as illustrated in FIG. 11D. As described above, the number of mouth shapes for reproducing voice data should be plural, and accordingly, a plurality of mouth shape candidates may include a plurality of mouth shapes. In one example, the electronic device 101 may display a selection screen 1040 including the still images 1041, 1042, 1043, and 1044 included in the mouth shape candidates. When one of the still images 1041, 1042, 1043, and 1044 is selected, the electronic device 101 may sequentially display the plurality of mouth shapes included in the mouth shape candidates, that is, reproduce a mouth shape change process while outputting a voice 1054 corresponding to voice data as illustrated in FIG. 11E. In FIG. 11E, a selection screen 1050 including a lower part of the face 1051 including the mouth shape is displayed. The selection screen 1050 may include a selection icon 1052 and a cancel icon 1053. When designation of the selection icon 1052 is identified, the electronic device 101 may select the corresponding mouth shape candidate as a mouth shape to be synthesized. When the cancel icon 1053 is selected, the electronic device 101 may display the selection screen 1040 including the still images 1041, 1042, 1043, and 1044. Alternatively, in another example, the electronic device 101 may output a voice corresponding to voice data while simultaneously reproducing a plurality of mouth shape candidates. For example, the electronic device 101 may reproduce a plurality of mouth shape candidates for each of the areas separated as illustrated in FIG. 11D, and the user may compare and select reproduction of the plurality of candidates.

Figure 11F:
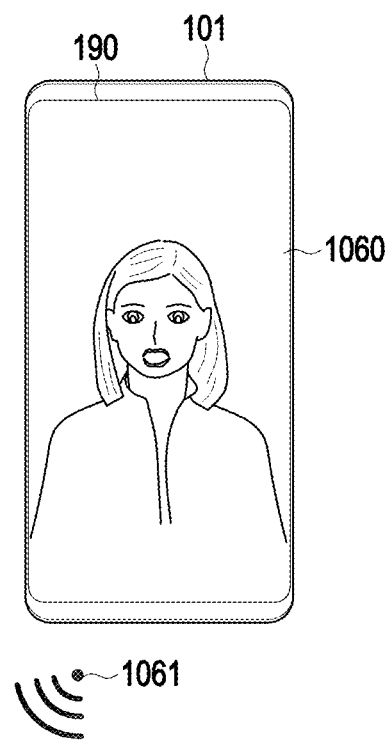

Referring back to FIG. 10, according to various embodiments, the electronic device 101 may identify selection of a first mouth shape candidate from among a plurality of mouth shape candidates in operation 1005. The electronic device 101 may display at least one second image including the first mouth shape candidate on the display module 190 by using the first mouth shape candidate and at least a portion of each of at least one first image in operation 1007. At least one second image may be at least one image (for example, at least one image 350*a*, 350*b*, 350*c*, and 350*n* of FIG. 3) completely synthesized with at least one original image after the mouth shape candidates are selected. For a brief description, the process of applying the super-resolution model and synthesizing the original image is omitted, and the process of applying the super-resolution model may be omitted according to implementation. As illustrated in FIG. 11F, the electronic device 101 may display one second image 1060 among at least one second image and output a voice 1061 corresponding to voice data to be synthesized. According to the above description, the user may identify reproduction of a plurality of mouth shape candidates to select more natural mouth shapes.

Meanwhile, as illustrated in FIGS. 11A to 11F, selecting one of the plurality of mouth shape candidates by the electronic device 101 before the application of super-resolution models to the low-resolution images with which the mouth shapes are synthesized (for example, at least one second image 520*a*, 520*b*, 520*c*, and 520*n* of FIG. 5) is only an example. As illustrated in the various alternative embodiments described with reference to FIGS. 4 and 5, there is no limitation in the time point at which the electronic device 101 selects one of the plurality of candidates. When the electronic device 101 performs the selection after generating a plurality of low-resolution image candidates, the plurality of low-resolution image candidates may be reproduced with a voice corresponding to voice data individually or at least simultaneously instead of a user interface for reproducing the mouth shapes (or lower part of the face) as illustrated in FIG. 11D. When the electronic device 101 performs the selection after generating a plurality of high-resolution image candidates, the plurality of high-resolution image candidates may be reproduced with a voice corresponding to voice data individually or at least simultaneously rather than a user interface for reproducing mouth shapes as illustrated in FIG. 11D. When the electronic device 101 performs the selection after generating a plurality of completely synthesized image candidates, the plurality of completely synthesized image candidates may be reproduced with a voice corresponding to voice data individually or at least simultaneously rather than a user interface for reproducing mouth spaces (or lower parts of the faces) as illustrated in FIG. 11D, and it may be understood by those skilled in the art that the user interface may also be variously implemented according to various implementations of a user selection time point as described above.

Figure 11G:
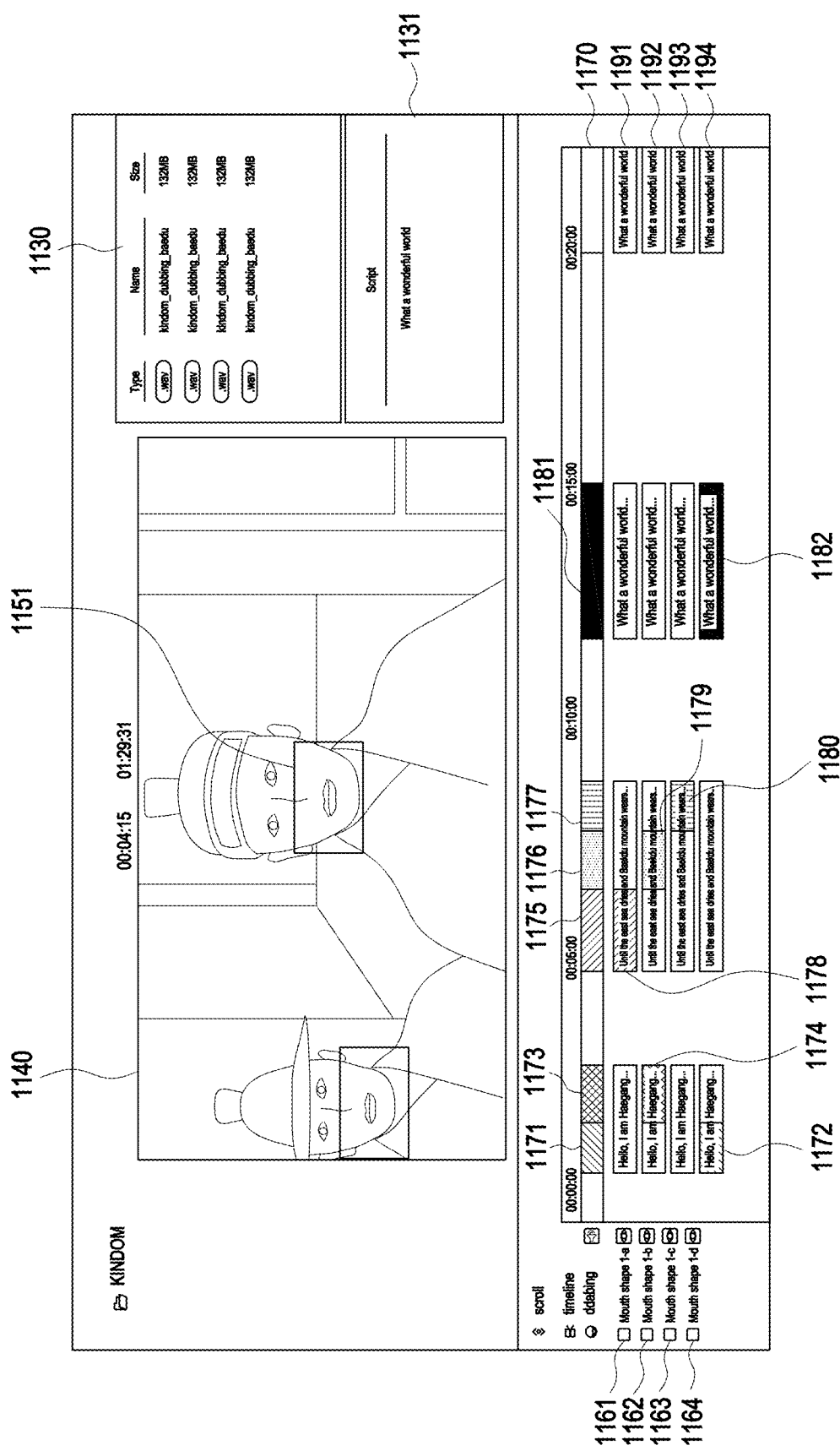

FIG. 11G illustrates a screen of an electronic device according to various embodiments.

According to various embodiments, the electronic device 101 may display a screen for selecting a mouth shape for each section of a video as illustrated in FIG. 11G. A file list 1130 of voice data to be synthesized may be included in the screen. Text 1131 corresponding to voice data to be synthesized may be included in the screen. One image 1140 in a video may be included in the screen. The image 1140 may be an image corresponding to an indicator indicating the current time point on a progress bar 1170. The image 1140 may include an object 1151 indicating a mouth part with which voice data is synthesized, and the corresponding part may be determined automatically or by a user input. Objects 1161, 1162, 1163, and 1164 corresponding to colors indicating a plurality of mouth shape candidates may be included in the screen. On the progress bar 1170, objects 1171, 1173, 1175, 1176, 1177, and 1181 indicating selected mouth shapes may be displayed. Further, for easy identification, objects 1172, 1174, 1178, 1179, 1180, and 1182 indicating selections may be displayed on the progress bars 1191, 1192, 1193, and 1194 for respective mouth candidates. For example, as illustrated in FIG. 11G, a plurality of mouth shape candidates (for example, 1175, 1176, and 1177) may be selected for one voice data (for example, voice data corresponding to "Until the East sea dries and Beakdu mountain wears").

Figure 12A:
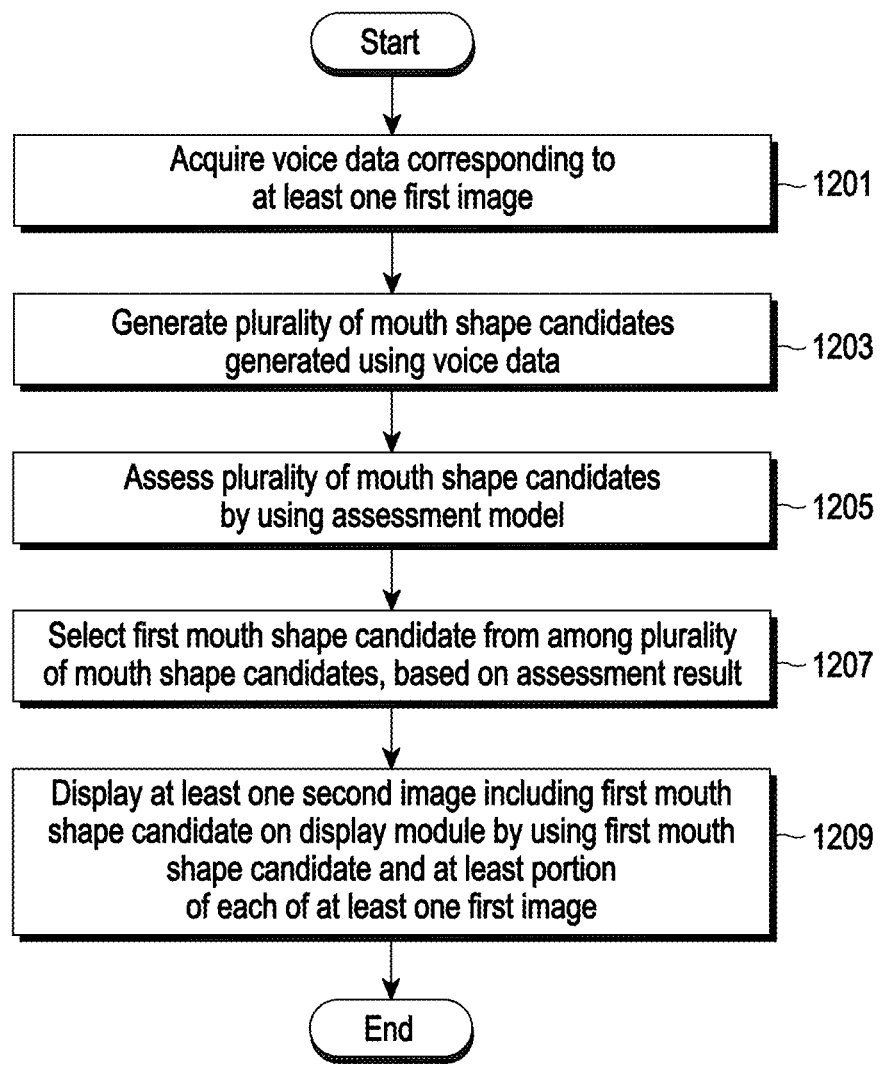
FIG. 12A is a flowchart illustrating a method of operating an electronic device according to various embodiments.

FIG. 12A is a flowchart illustrating a method of operating an electronic device according to various embodiments.

According to various embodiments, the electronic device 101 (for example, the processor 120) may acquire voice data corresponding to at least one first image in operation 1201. At least one first image may be at least one original image described above. The electronic device 101 may generate a plurality of mouth shape candidates generated using voice data in operation 1203. The electronic device 101 may assess each of the plurality of mouth shape candidates through assessment models in operation 1205. The assessment models may have mouth shapes and/or original images as input values and have scores indicating degrees of matching between mouth shapes and original images as output values. The electronic device 101 may apply the assessment models to the plurality of mouth shape candidates sequentially and/or simultaneously, and may identify at least one assessment result (for example, score) corresponding to the plurality of mouth shape candidates. The electronic device 101 may select a first mouth shape candidate from among the plurality of mouth shape candidates on the basis of the assessment result in operation 1207 in which case a user input may not be required. In an alternative embodiment, the electronic device 101 may provide a user interface for selecting mouth shape candidates which satisfy a predetermined condition from among the plurality of mouth shape candidates. For example, the electronic device 101 may provide a user interface for selecting some mouth shape candidates having scores higher than or equal to a threshold value among the plurality of mouth shape candidates. In this case, the electronic device 101 may select one mouth shape on the basis of a user input of selecting one from among some mouth shape candidates which satisfy the predetermined condition. The electronic device 101 may display at least one second image including the first mouth shape candidate on the display module 190 by using the first mouth shape candidate and at least a portion of each of at least one first image in operation 1209.

Figure 12B:
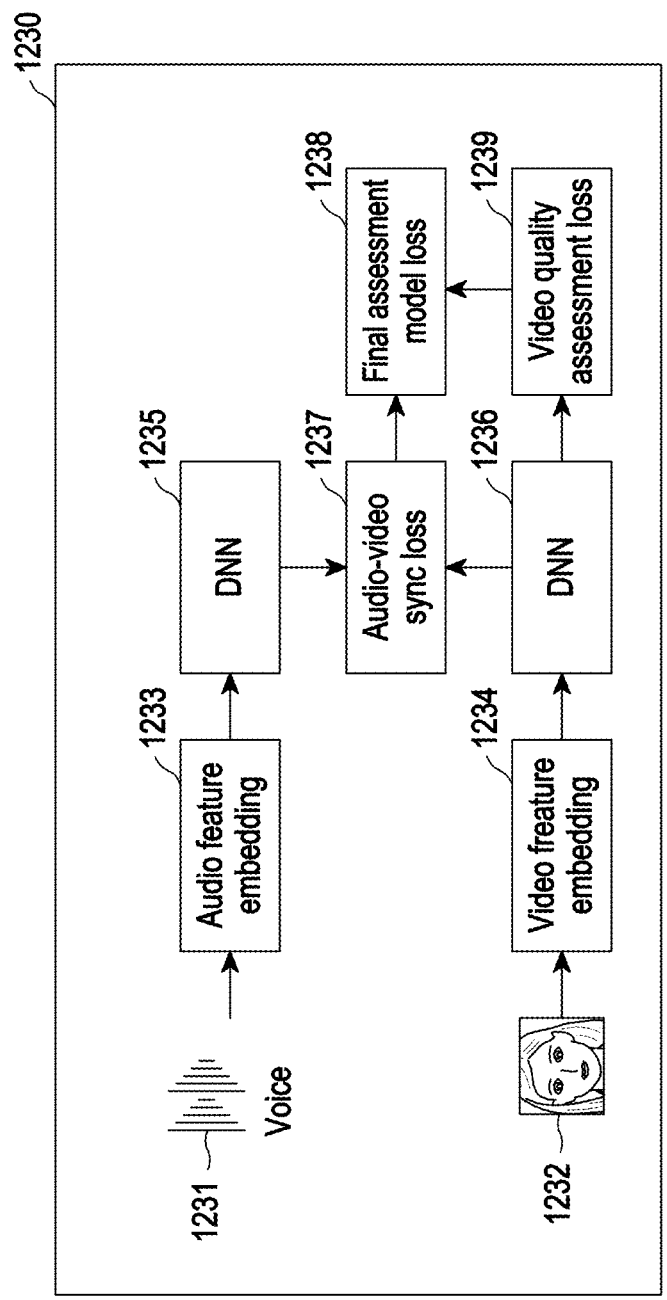
FIG. 12B illustrates an assessment model according to various embodiments.

FIG. 12B illustrates an assessment model according to various embodiments.

An assessment model 1230 according to various embodiments may receive voice data 1231 and a mouth shape 1232 as input values. The assessment model 1230 may include an audio feature embedding module 1233, and the audio feature embedding module 1233 may extract feature data from voice data 1231. The assessment model 1230 may include a video feature embedding module 1234, and the video feature embedding module 1234 may extract feature data from the mouth shape 1232. The assessment model 1230 may include a DNN 1235, and the DNN 1235 may reduce and output a dimension of feature data corresponding to audio data. The assessment model 1230 may include a DNN 1236, and the DNN 1236 may reduce and output a dimension of feature data corresponding to video data. The feature data having the reduced dimension corresponding to audio data and the feature data having the reduced dimension corresponding to video data may be input into an audio-video sync loss module 1237. The audio-video sync loss module 1237 may output a first loss value by using the feature data having the reduced dimension corresponding to audio data and the feature data having the reduced dimension corresponding to video data. The first loss value may be a value indicating a level that does not match between audio data and video data. Meanwhile, the video quality assessment loss module 1239 may output a second loss value by using the feature data having the reduced dimension corresponding to video data. For example, the second loss value may be determined on the basis of whether there is an artifact in the video. The final assessment model loss module 1238 may output a final loss value by using the first loss value and the second loss value. For example, the final assessment model loss module 1238 may determine the final loss value by a sum of weighted values of the first loss value and the second loss value, but there is no limitation in a determination type. The DNNs 1235 and 1236 of the assessment model 1230 may be trained using training data. The electronic device 101 may input each of a plurality of mouth shape candidates and original voice data into the assessment model 1230, and may select one of the plurality of mouth shape candidates on the basis of the output value (for example, the final loss value) of the assessment model 1230. Meanwhile, the assessment model of FIG. 12B is only an example, and it is understood by those skilled in the art that there is no limitation if the assessment model is a model for assessing sync between audio data and video data.

Figure 13:
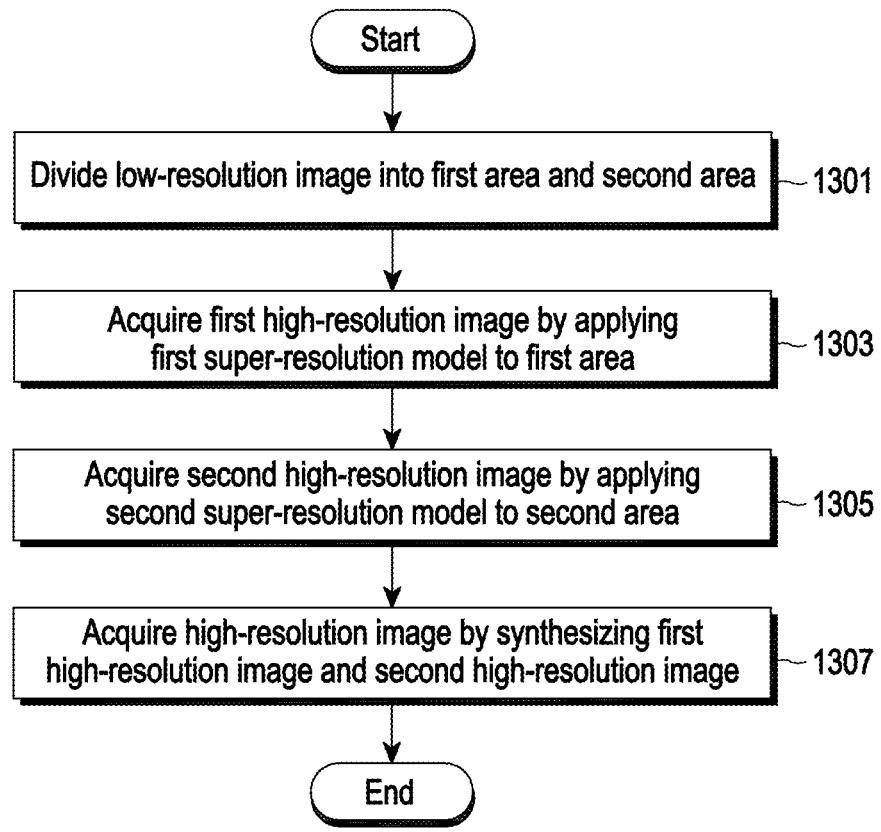
FIG. 13 is a flowchart illustrating a method of operating the electronic device according to various embodiments.
Figure 14:
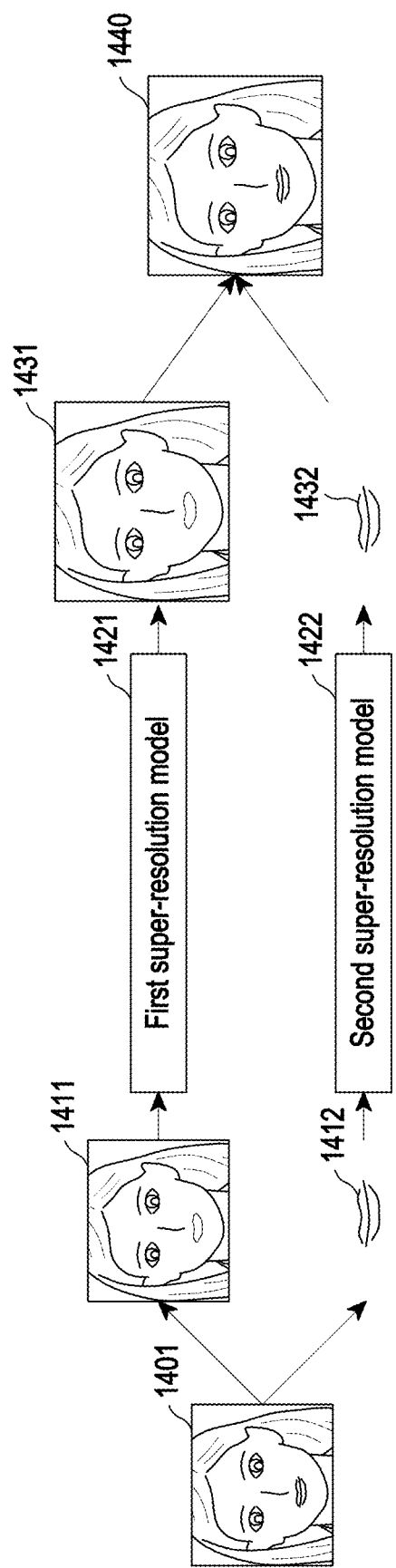
FIG. 14 illustrates the application of a plurality of super-resolution models to one image according to various embodiments.

FIG. 13 is a flowchart illustrating a method of operating the electronic device according to various embodiments. The embodiment of FIG. 13 is described with reference to FIG. 14. FIG. 14 illustrates the application of a plurality of super-resolution models to one image according to various embodiments.

Referring to FIGS. 13 and 14 together, according to various embodiments, the electronic device 101 (for example, the processor 120) may divide a low-resolution image 1401 into a first area 1411 and a second area 1412 in operation 1301. For example, the electronic device 101 may detect an area including a mouth and identify the area including the mouth as the second area 1412. Meanwhile, although it is illustrated that the first area 1411 is an area other than the second area 1412 in the example of FIG. 14, it is only an example, and the first area 1411 may be implemented as the entire area of the low-resolution image 1401. Meanwhile, there is no limitation in a model for detecting the area including the mouth. The electronic device 101 may detect the area including the mouth on the basis of a landmark identified using, for example, a landmark detection model, but there is no limitation. Meanwhile, in an alternative embodiment, the electronic device 101 may identify a mouth shape selected from a plurality of mouth shape candidates as the second area 1412 and identify some or all of the low-resolution image with which the mouth shape is not synthesized as the first area 1411.

According to various embodiments, the electronic device 101 may acquire a first high-resolution image 1431 by applying a first super-resolution model 1421 to the first area 1411 in operation 1303. The electronic device 101 may acquire a second high-resolution image 1432 by applying a second super-resolution model 1422 to the second area 1412 in operation 1305. The first super-resolution model 1421 may be, for example, an artificial intelligence model trained to up-scale a low-resolution face image to a high-resolution face image or an artificial intelligence model trained using a face image as training data. The first super-resolution model 1421 may be called a model specialized for the first area 1411 (that is, an object, for example, a face included in the first area 1411). Meanwhile, when the artificial intelligence model for up-scaling the face image is applied, the resolution for an overall area of the face image may be increased, but a mouth shape, particularly, a teeth part may be unnaturally generated. The second super-resolution model 1422 may be, for example, an artificial intelligence model trained to up-scale a low-resolution face image to a high-resolution face image or an artificial intelligence model trained using a face image as training data. When the second super-resolution model 1422 is applied, a mouth shape, particularly, a teeth part may be naturally generated compared to the case in which the first super-resolution model 1421 is applied. The second super-resolution model 1422 may be called a model specialized for the second area 1412 (that is, an object, for example, a mouth and/or teeth included in the second area 1412). As described above, the first super-resolution model 1421 and/or the second super-resolution model 1422 may be SISR and/or MISR-based artificial intelligence models, and structures of the neural network may have various structures, for example, SRCNN, FSRCNN, ESPCN, VDSR, DRCN, SRResNet, DRRN, EDSR, DensseSR, MemNet, GAN, DBVSR, LGFN, DynaVSR, and iSeeBetter, but those skilled in the art can understand that there is no limitation. The electronic device 101 may synthesize the first high-resolution image 1431 and the second high-resolution image 1432 to acquire a high-resolution image 1440 in operation 1307. Compared to the result of applying the first super-resolution model 1421 related to the face image to the low-resolution image 1401, the high-resolution image 1440 may have more a natural mouth shape. The electronic device 101 may generate at least one third image (for example, at least one second image 340a, 340b, 340c, and 340n of FIG. 3) by applying the plurality of super-resolution models to at least one second image (for example, at least one second image 320a, 320b, 320c, and 320n of FIG. 3).

Figure 15:
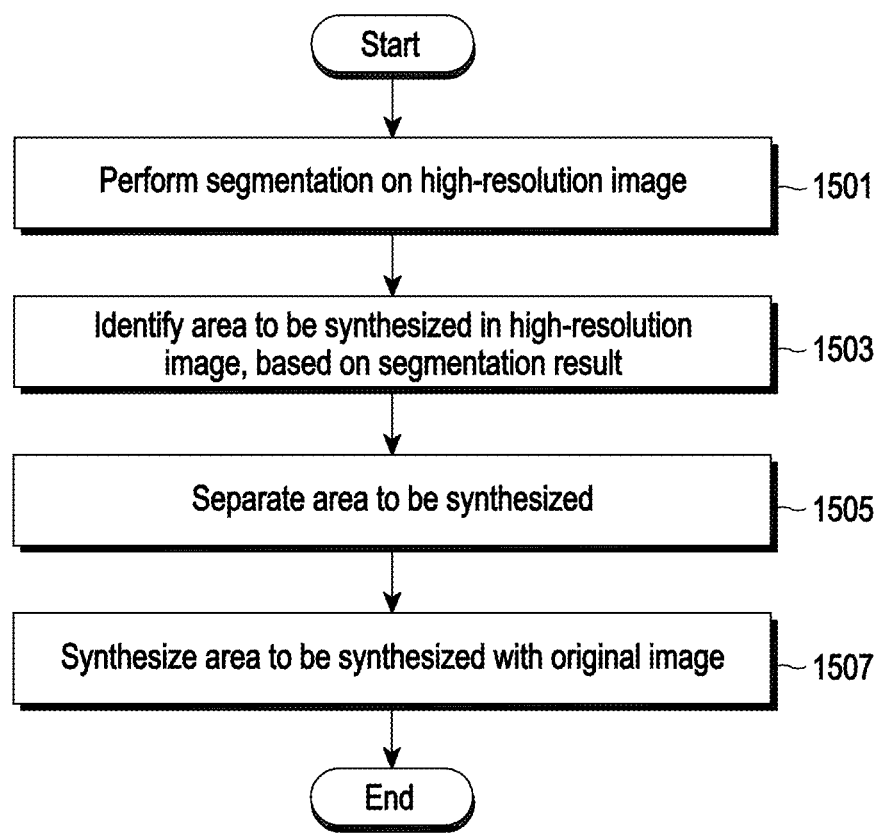
FIG. 15 is a flowchart illustrating a method of operating the electronic device according to various embodiments.
Figure 16:
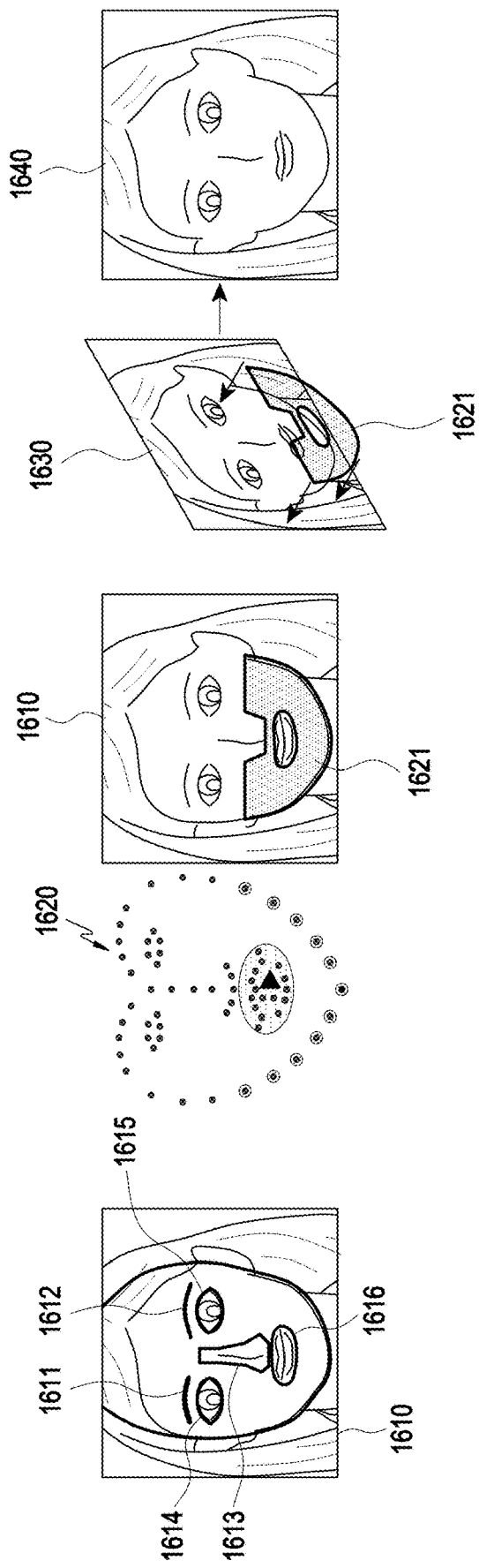
FIG. 16 illustrates a process of synthesizing some areas of the high-resolution image with an original image according to various embodiments.

FIG. 15 is a flowchart illustrating a method of operating the electronic device according to various embodiments. The embodiment of FIG. 15 will be described with reference to FIG. 16. FIG. 16 illustrates a process of synthesizing some areas of the high-resolution image with an original image according to various embodiments.

Referring to FIGS. 15 and 16 together, according to various embodiments, the electronic device 101 (for example, the processor 120) may perform segmentation (for example, face segmentation) on a high-resolution image 1610 in operation 1501. For example, the electronic device 101 may segment a plurality of landmarks 1611, 1612, 1613, 1614, and 1615 by applying a landmark detection model to the high-resolution image 1610. The landmarks are elements included in the face, and may be for example, a noise, eyes, a mouth, eyebrows, a jaw, and the like, but there is no limitation. The landmarks 1611, 1612, 1613, 1614, and 1615 may be expressed by, for example, a plurality of coordinates 1620. In operation 1503, the electronic device 101 may identify an area 1621 to be synthesized in the high-resolution image 1610 on the basis of the segmentation result. For example, the electronic device 101 may identify the area 1620 to be synthesized on the basis of the plurality of coordinates 1620. In one example, the electronic device 101 may identify, as the area 1621 to be synthesized, an inner space of a connection line connecting coordinates corresponding to the mouth and an inner space defined by a connection line that connects coordinates corresponding to the jaw and a connection line that connects both ends of the connection line corresponding to the jaw but at least partially overlaps a connection line corresponding to the noise, but there is no limitation in the area 1621 to be synthesized. The electronic device 101 may separate the area 1621 to be synthesized in operation 1505. The electronic device 101 may synthesize the area 1621 to be synthesized with the original image 1630 in operation 1507. Accordingly, a completely synthesized image 1640 in which the area 1621 to be synthesized is synthesized with the original image 1630 may be acquired. When the entire face area is synthesized, somewhat unnatural synthesis may be performed, and accordingly, the area 1621 to be synthesized may be reduced as much as possible to achieve more natural synthesis.

Figure 17A:
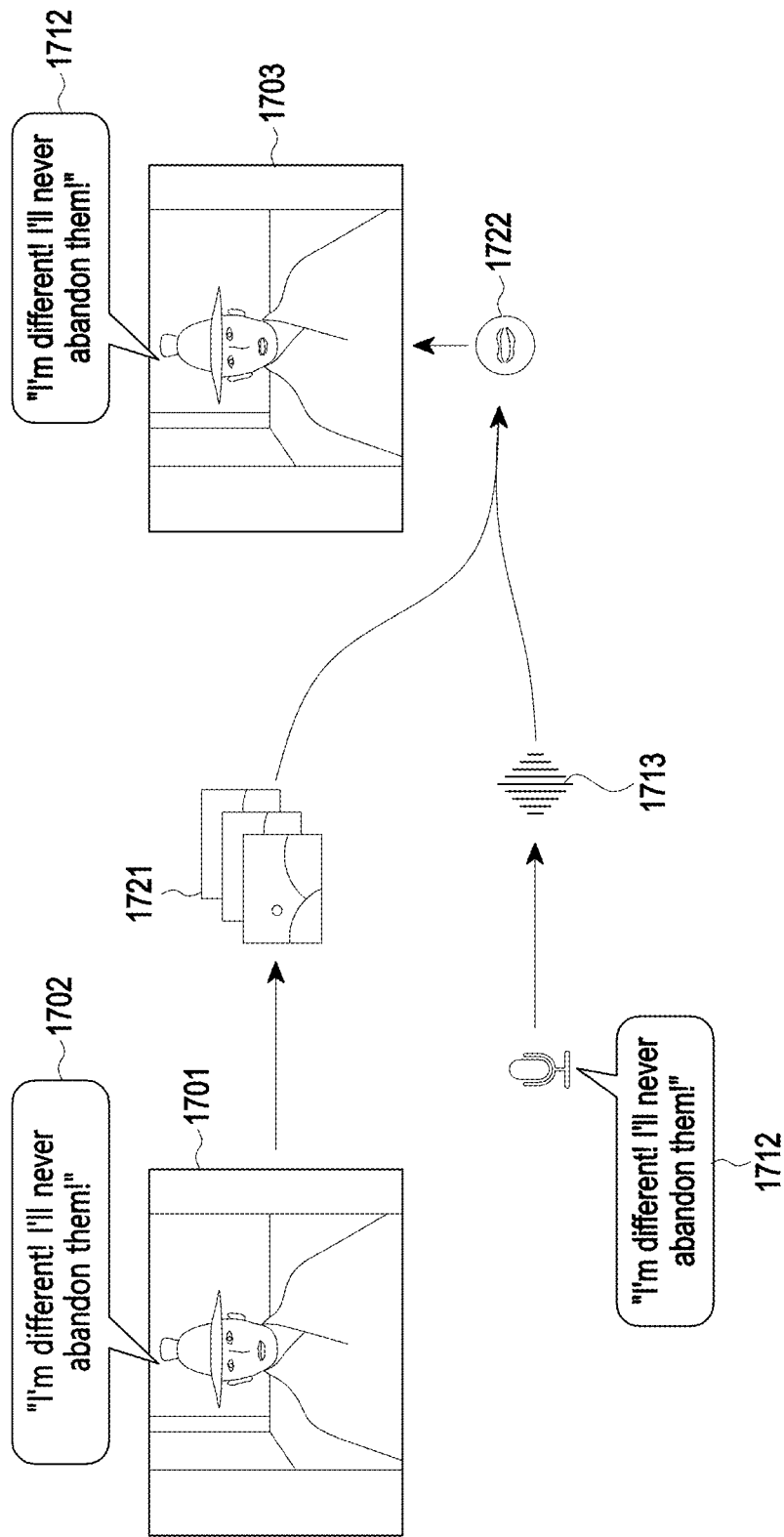
FIG. 17A illustrates a method of operating the electronic device according to various embodiments.

FIG. 17A illustrates a method of operating the electronic device according to various embodiments.

According to various embodiments, the electronic device 101 may load a video file with which an image is synthesized, and the video file may include at least one image 1701 and voice data 1702. Although FIG. 17A illustrates that one image 1701 is displayed, the electronic device 101 may sequentially display at least one image 1701 according to reproduction of a video file and simultaneously output a voice corresponding to voice data 1702.

According to various embodiments, the electronic device 101 may receive a voice to be synthesized, that is, a foreign language voice 1712 through the input/output module 140. The electronic device 101 may generate voice data 1713 including the foreign language voice 1712 and an original background sound by processing the foreign language voice 1712. The electronic device 101 may acquire the original background sound by removing speech data from original voice data 1702. The electronic device 101 may generate voice data 1713 by synthesizing the acquired original background sound with the foreign language voice 1712. Meanwhile, FIG. 17A illustrates that the electronic device 101 acquires the foreign language voice 1712 through the input/output module 140, but it is only an example. The electronic device 101 may acquire text and generate the foreign language voice 1712 on the basis of the text. For example, the electronic device 101 may generate the foreign language voice 1712 of imitating a voice of a speaker of the original voice data 1702. Since the speaker has difficulty in fluently speaking two or more languages, the electronic device 101 may support a function of generating the foreign language voice 1712 on the basis of text. For example, the electronic device 101 may input text into an artificial intelligence model trained on the basis of feature information of the original voice (for example, pronunciation feature, tone feature, speed feature, and the like). The artificial intelligence model may receive text as an input value and convert the text into a voice and/or spectrogram corresponding to the text.

According to various embodiments, the electronic device 101 may generate a dubbed video file 1722 by mapping (or time-synchronizing) the voice data 1713 to at least one image 1721 with which a mouth shape generated on the basis of at least some of the various embodiments is synthesized. According to reproduction of the dubbed video file 1722, the image 1703 with which the mouth shape is synthesized and the voice 1712 corresponding to the voice data 1713 may be time-synchronized and output.

Figure 17B:
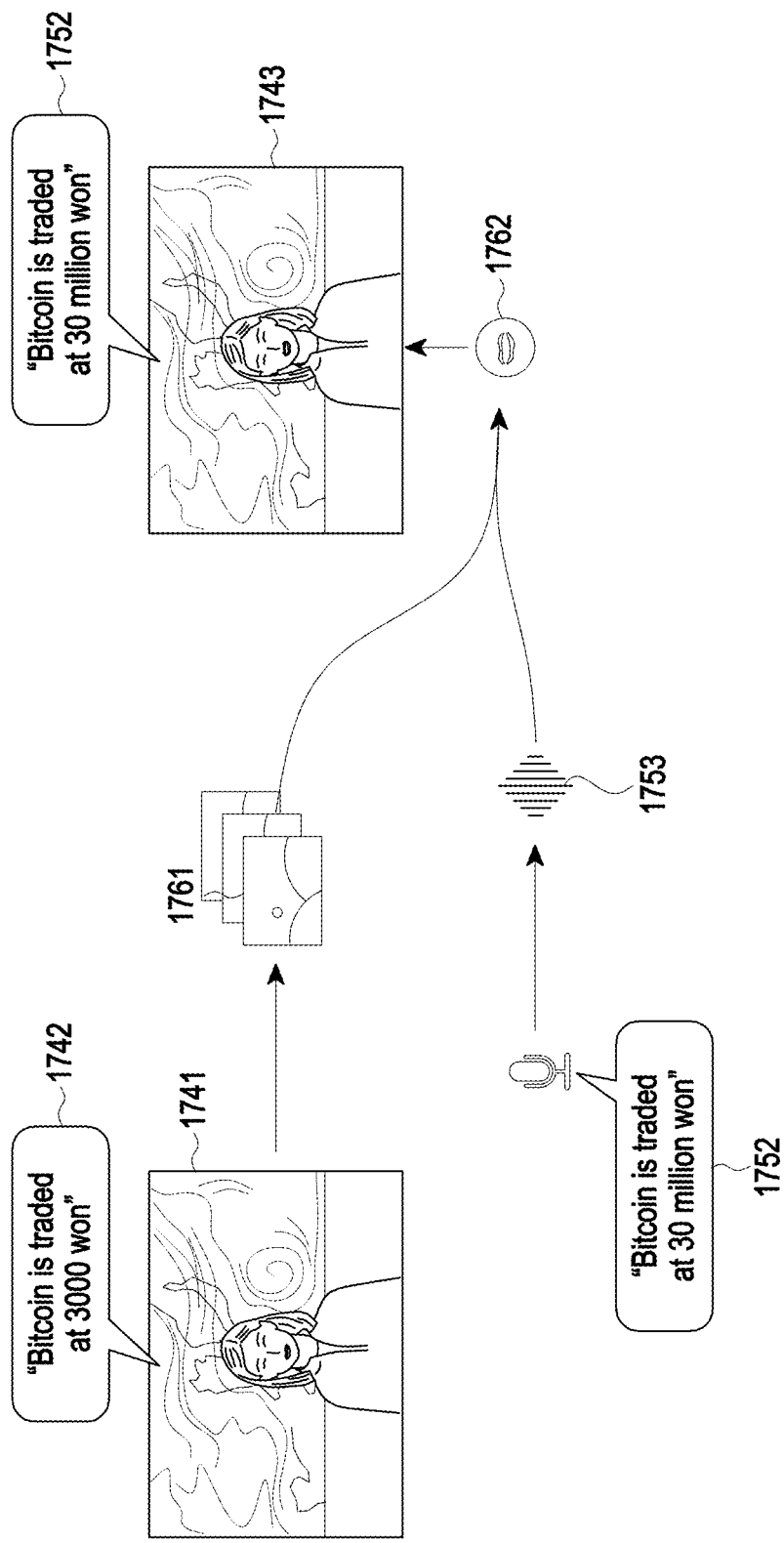
FIG. 17B illustrates a method of operating the electronic device according to various embodiments.

FIG. 17B illustrates a method of operating the electronic device according to various embodiments.

According to various embodiments, the electronic device 101 may load a video file with which an image is synthesized, and the video file may include at least one image 1741 and voice data 1742. Although FIG. 17B illustrates that one image 1741 is displayed, the electronic device 101 may sequentially display at least one image 1741 according to reproduction of a video file and simultaneously output a voice corresponding to the voice data 1742.

According to various embodiments, the electronic device 101 may receive a voice to be synthesized, that is, a changed voice 1752 through the input/output module 140. The electronic device 101 may generate voice data 1753 including the changed voice 1752 and an original background sound by processing the changed voice 1752. The electronic device 101 may acquire the original background sound by removing speaking data from original voice data 1742. The electronic device 101 may generate voice data 1753 by synthesizing the acquired original background sound with the changed voice 1752. Meanwhile, FIG. 17B illustrates that the electronic device 101 acquires the changed voice 1752 through the input/output module 140, but it is only an example. The electronic device 101 may acquire text and generate the changed voice 1752 on the basis of the text. For example, the electronic device 101 may provide a text file which is a caption result of the original voice data 1742, and the user may replace and input changed text into a part required to be modified in the text file. For example, the electronic device 101 may generate the changed voice 1752 of imitating a voice of a speaker of the original voice data 1742. The electronic device 101 may generate a dubbed video file 1762 by mapping (or time-synchronizing) the voice data 1753 with at least one image 1761 with which the mouth shape generated on the basis of at least some of the various embodiments is synthesized. According to reproduction of the dubbed video file 1762, the image 1743 with which the mouth shape is synthesized and the voice 1752 corresponding to the voice data 1753 may be time-synchronized and output.

Figure 18A:
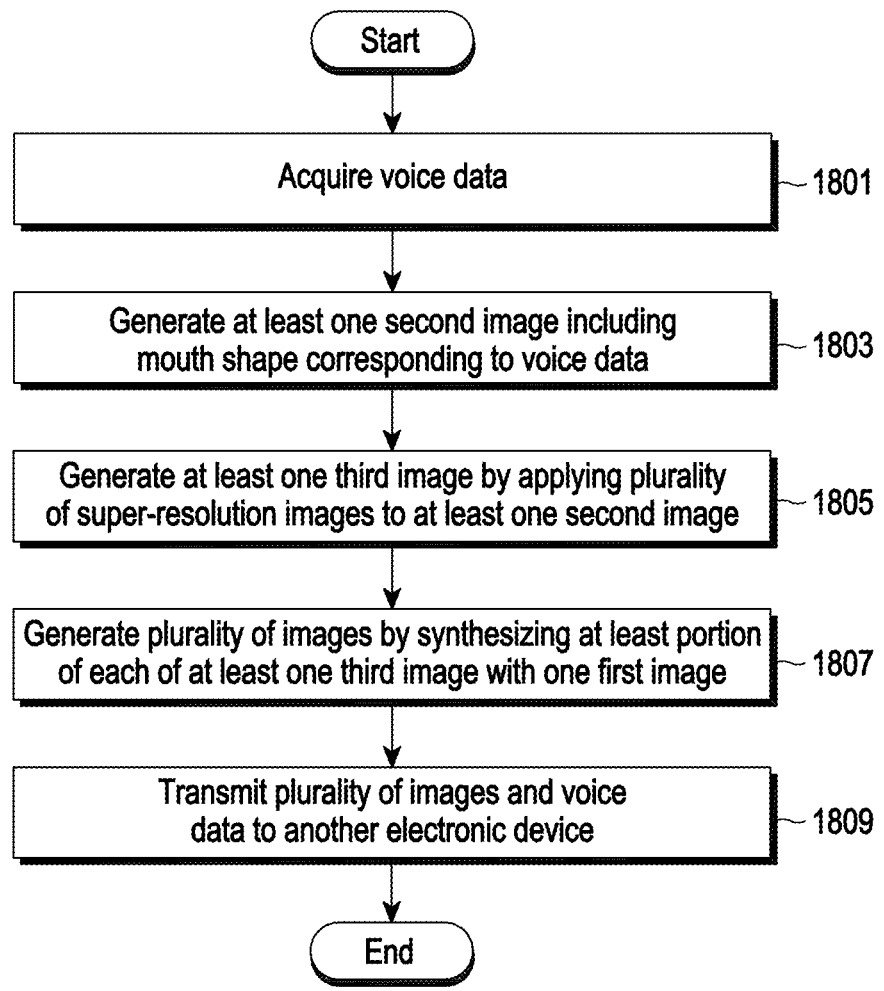
FIG. 18A is a flowchart illustrating a method of operating the electronic device according to various embodiments.
Figure 18B:
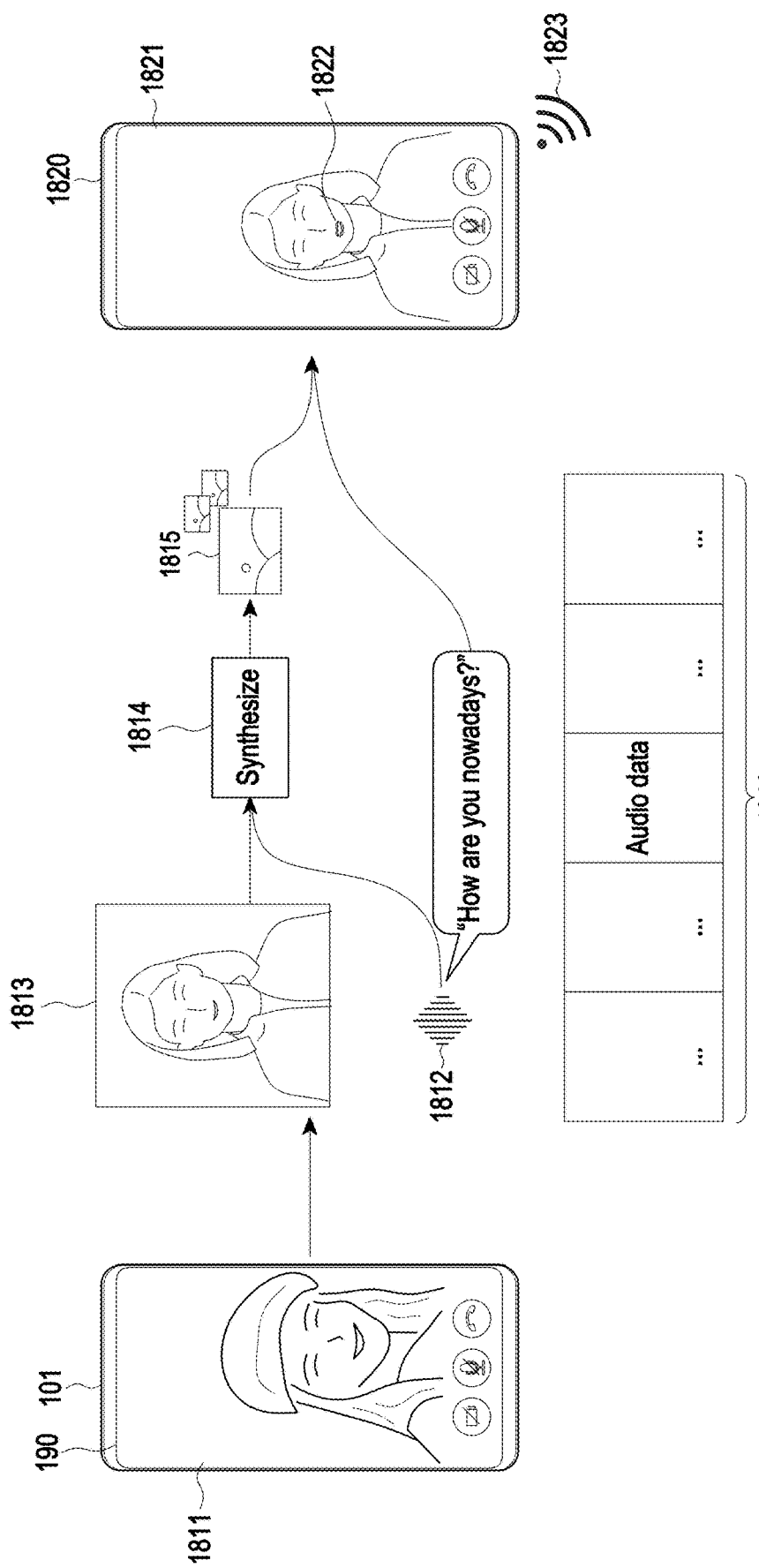
FIG. 18B illustrates a method of operating the electronic device making a video call according to various embodiments.

FIG. 18A is a flowchart illustrating a method of operating the electronic device according to various embodiments. The embodiment of FIG. 18A will be described with reference to FIG. 18B. FIG. 18B illustrates a method of operating the electronic device making a video call according to various embodiments.

Referring to FIGS. 18A and 18B together, according to various embodiments, the electronic device 101 (for example, the processor 120) may acquire voice data 1812 in operation 1801. The voice data 1812 may include, for example, time series voice data 1813. For example, the electronic device 101 may execute a video call application and display an execution screen 1811 of the video call application on the display module 190. The execution screen 1811 of the video call application may include, for example, an image transmitted from an electronic device of a call counterpart, that is, another electronic device 1820. The video call application may support a general function of transmitting an image acquired through a camera module of the electronic device 101 and the voice data 1812 to the electronic device of the call counterpart. Meanwhile, when a predetermined condition is satisfied, the video call application according to various embodiments may support a function of transmitting the voice data 1812 and a completely synthesized image generated by synthesizing the basic image with mouth shapes generated on the basis of the voice data 1812 to the electronic device of the call counterpart. For example, the predetermined condition may be the case in which a predetermined mode (for example, a privacy enhancement mode or a data saving mode) is activated according to a user input, a communication environment is poor (for example, a weak electric field), and/or fallback to a low-speed network system is made (for example, CS fallback), but there is no limitation in the type of the predetermined condition.

According to various embodiments, the electronic device 101 may generate at least one second image (for example, at least one low-resolution image) including mouth shapes corresponding to voice data in operation 1803. For example, when voice data is synthesized with the existing video file, a plurality of second images (for example, low-resolution images) may be generated according to a plurality of original images. The electronic device 101 may generate a plurality of mouth shapes for imitating a speech of voice data and synthesize one image 1813 with a plurality of mouth shapes 1814, so as to generate a plurality of second images (for example, low-resolution images). The electronic device 101 may generate at least one third image by applying a plurality of super-resolution models to at least one second image in operation 1805. The electronic device 101 may generate a plurality of images 1815 by synthesizing at least a portion of each of the at least one third image with the first image in operation 1805. Operation 1803, operation 1805, and/or operation 1807 may be performed according to at least some of the various embodiments. The electronic device 101 may transmit a plurality of images and voice data to another electronic device 1820, that is, the electronic device of the call counterpart in operation 1807. In the electronic device of the call counterpart, a plurality of images 1821 and a voice 1823 corresponding to voice data may be time-synchronized and reproduced, and accordingly, an effect of moving only a mouth shape 1822 according to the voice in a still image may be provided.

Meanwhile, in another embodiment, when a voice message is transmitted rather than a video call, the electronic device 101 may generate a plurality of completely synthesized images from one image as described above. The electronic device 101 may generate a plurality of mouth shapes corresponding to the voice data. The electronic device 101 may generate a plurality of completely synthesized images by synthesizing a plurality of mouth shapes with one image. A detailed process of generating the plurality of completely synthesized images is based on at least some of the various embodiments. Accordingly, while only one still image is attached to one voice message and transmitted conventionally, the electronic device 101 may attach a plurality of images for reproducing mouth shapes to a voice message and transmit the same.

Figure 18C:
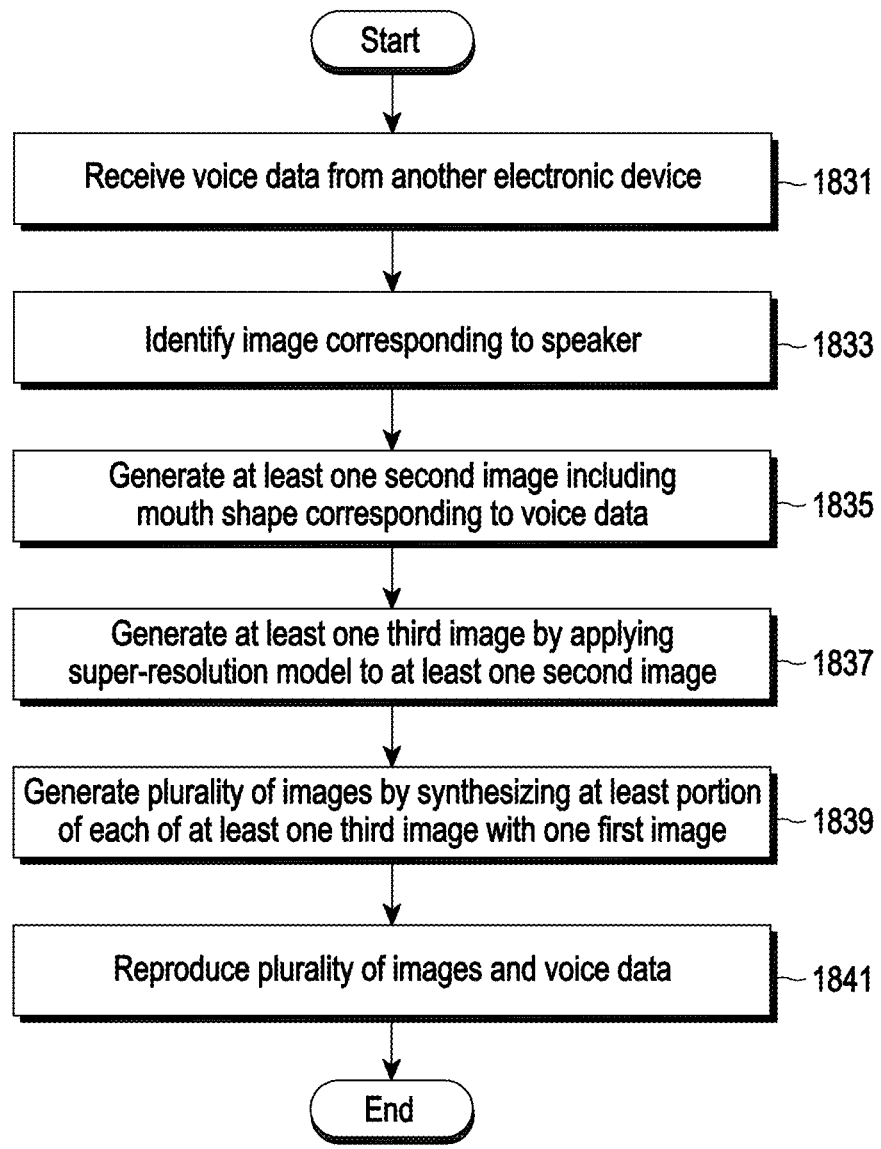
FIG. 18C is a flowchart illustrating a method of operating the electronic device according to various embodiments.

FIG. 18C is a flowchart illustrating a method of operating the electronic device according to various embodiments.

According to various embodiments, the electronic device 101 (for example, the processor 120) may receive voice data from another electronic device in operation 1831. The electronic device 101 may identify an image corresponding to the speaker in operation 1833. For example, the image may be associated with information on the speaker (For example, a phone number and/or a name) and stored in the electronic device 101 in advance. Alternatively, the electronic device 101 may receive only one image along with voice data from another electronic device. The electronic device 101 may generate at least one second image including a mouth shape corresponding to voice data in operation

1835. The electronic device 101 may generate a plurality of mouth shapes for imitating a speech of voice data and synthesizing the plurality of mouth shapes with one image, so as to generate a plurality of second images (for example, low-resolution images). In operation 1837, the electronic device 101 may generate at least one third image by applying super-resolution models to at least one second image. In operation 1839, the electronic device 101 may generate a plurality of images by synthesizing at least a portion of each of at least one third image with one first image. Operation 1835, operation 1837, and/or operation 1839 may be performed according to at least some of the various embodiments. The electronic device 101 may reproduce a plurality of images and voice data in operation 1841. Accordingly, an effect of moving only a mouth shape according to a voice in a still image may be provided.

Figure 19:
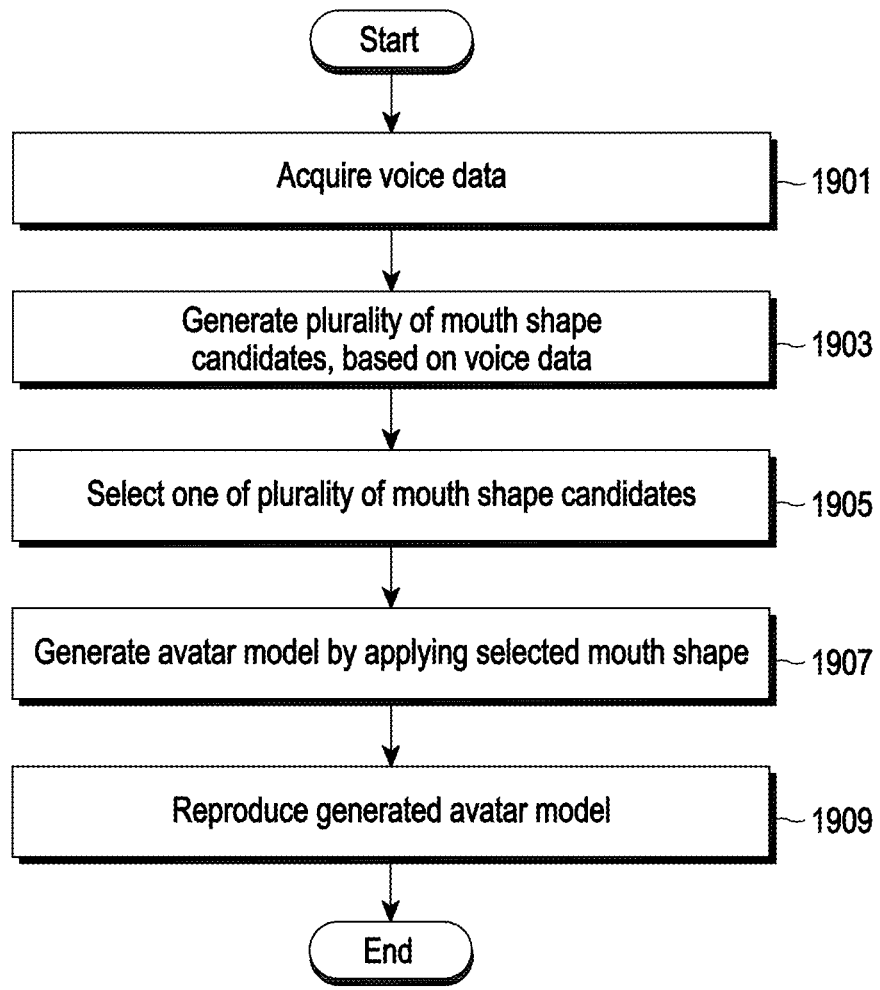
FIG. 19 is a flowchart illustrating a method of operating the electronic device according to various embodiments.

FIG. 19 is a flowchart illustrating a method of operating the electronic device according to various embodiments.

According to various embodiments, the electronic device 101 (for example, the processor 120) may acquire voice data in operation 1901. In operation 1903, the electronic device 101 may generate a plurality of mouth shape candidates on the basis of voice data. The electronic device 101 may select one of the plurality of mouth shape candidates in operation 1905. At least some of the various embodiments may be used for the generation and selection of the plurality of mouth shape candidates. The electronic device 101 may generate an avatar model by applying the selected mouth shape in operation 1907. The avatar model may operate in, for example, a virtual environment (for example, a VR virtual conference, story-telling, and a space in which an avatar imitating a streamer voice acts), and an algorithm for generating all avatar models including mouth shapes may be stored in the electronic device 101. Meanwhile, if there is a change that the generated mouth shape is unnatural, the plurality of mouth shape candidates may be generated and selected as in the present embodiment, and thus a more natural mouth shape can be generated. The electronic device 101 may reproduce the generated avatar models in operation 1909.

Figure 20:
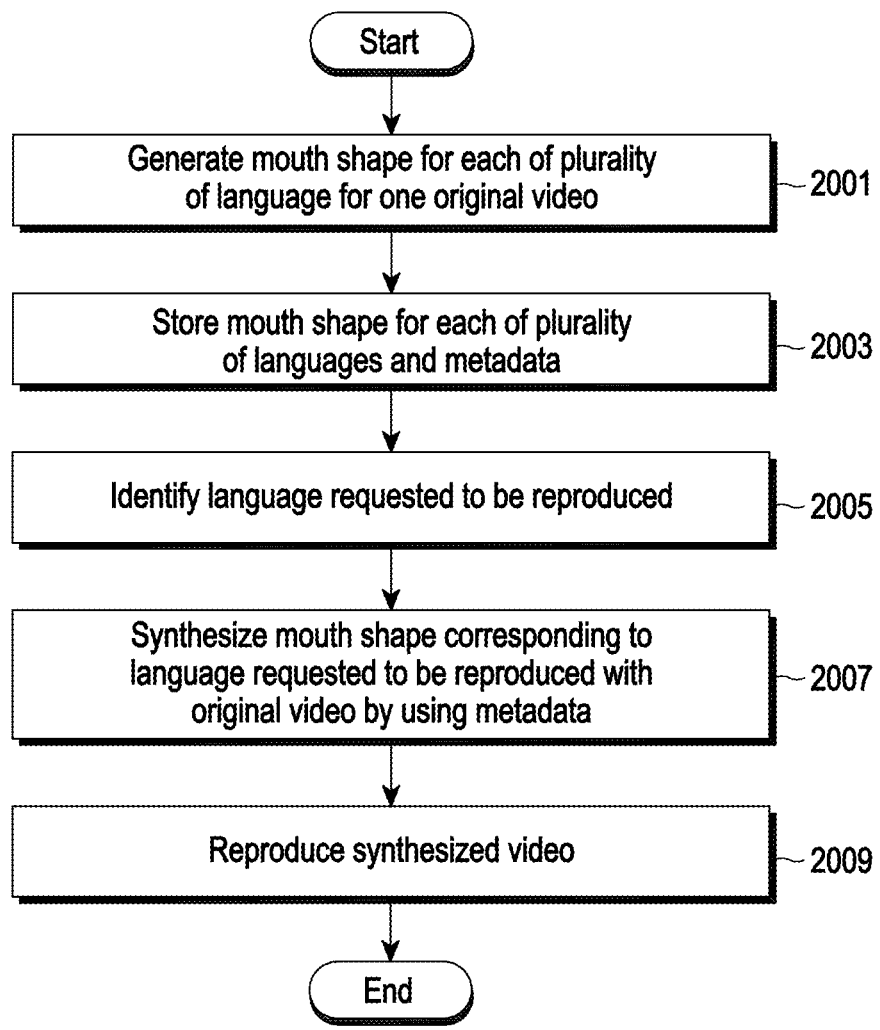
FIG. 20 is a flowchart illustrating a method of operating the electronic device according to various embodiments.

FIG. 20 is a flowchart illustrating a method of operating the electronic device according to various embodiments.

According to various embodiments, the electronic device 101 (for example, the processor 120) may generate mouth shapes for a plurality of languages for one original video in operation 2001. The electronic device 101 may acquire, for example, voice data and/or text for each of the plurality of languages corresponding to one original video. The electronic device 101 may generate the mouth shapes for each of the plurality of languages on the basis of the voice data and/or text for each of the plurality of languages, and the process of generating the mouth shapes has been described in detail, so the description is omitted herein.

According to various embodiments, the electronic device 101 may store the mouth shapes for each of the plurality of languages and metadata in operation 2003. The metadata is, for example, data used for synthesizing the mouth shapes with an original video and may include, for example, information related to the mouth shape synthesis location within the image of the original video, but there is no limitation in the type. When all mouth shapes for the respective languages are synthesized, the number of files having substantially the same size as the original video, which is equal to the number of languages, should be generated and stored, which needs relatively large resources. The electronic device 101 may store only the mouth shapes for each language and the metadata, thereby reducing resources required for storage.

According to various embodiments, the electronic device 101 may identify a reproduction request language in operation 2005. The electronic device 101 may synthesize the mouth shape corresponding to the reproduction request language with the original video by using the metadata in operation 2007. That is, the electronic device 101 may perform synthesis on the original video after a reproduction request time point. The electronic device 101 may reproduce the synthesized video in operation 2009. When the reproduction request language is changed during the reproduction, the electronic device 101 may synthesize the mouth shape corresponding to the changed language with the original video and provide the same.

Figure 21:
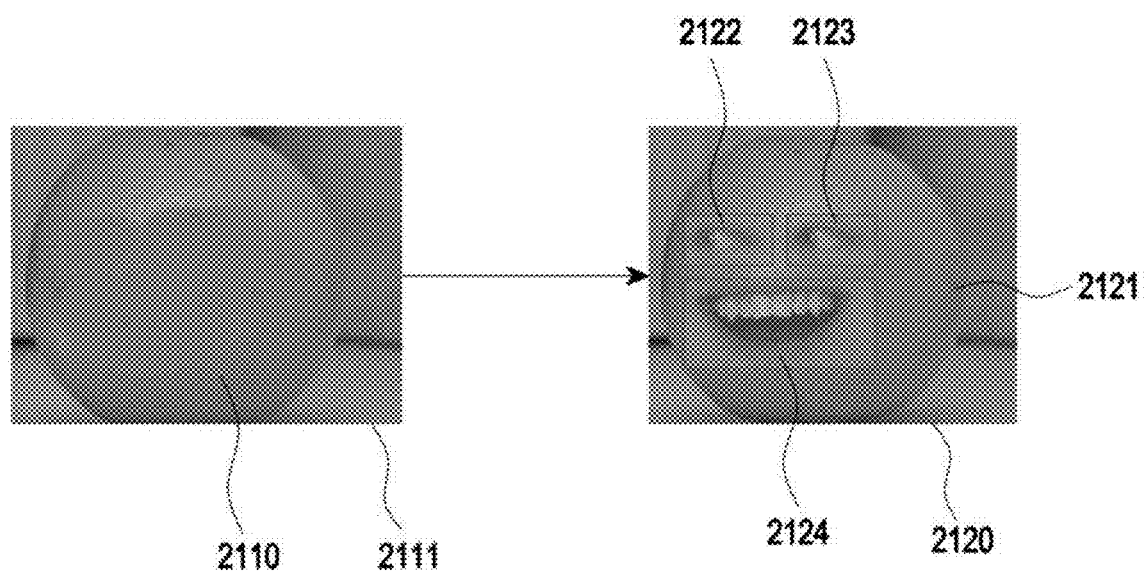
FIG. 21 illustrates a method of operating the electronic device according to various embodiments.

FIG. 21 illustrates a method of operating the electronic device according to various embodiments.

According to various embodiments, the electronic device 101 (for example, the processor 120) may generate a face including a mouth shape for an object rather than a person. For example, the electronic device 101 may identify a user selection for an object 2110 in which the face is synthesized with an image 2111 or may automatically detect the object. When landmarks such as eyes, a noise, and a mouth are not detected in the object 2110 selected by the user, the electronic device 101 may additionally generate objects such as eyes 2122 and 2123, and a mouth 2124 and synthesize the same with the existing object 2110, so as to generate an image 2120 including the synthesized object 2121. For example, the electronic device 101 may use at least some of the methods for generating the mouth shapes during a process of generating the object of the mouth 2124 to generate the object of the mouth 2124 corresponding to voice data to be synthesized. The electronic device 101 may generate a video synthesized according to the above-described scheme, and a video in which an object having eyes and a mouth speaks voice data may be reproduced. Meanwhile, the types of objects (eyes and mouth) included in the image 2120 are only examples, and may include additional objects.

Figure 22A:
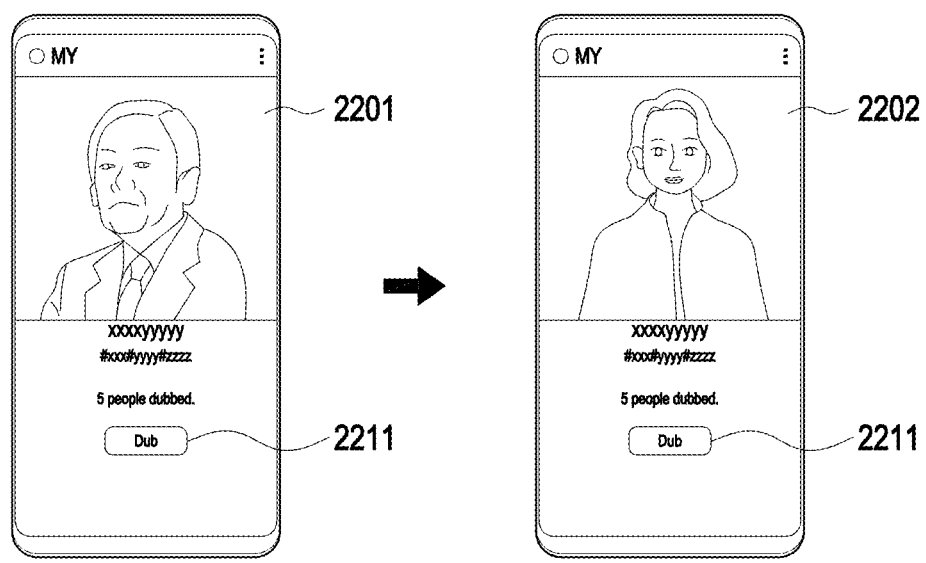
Figure 22B:
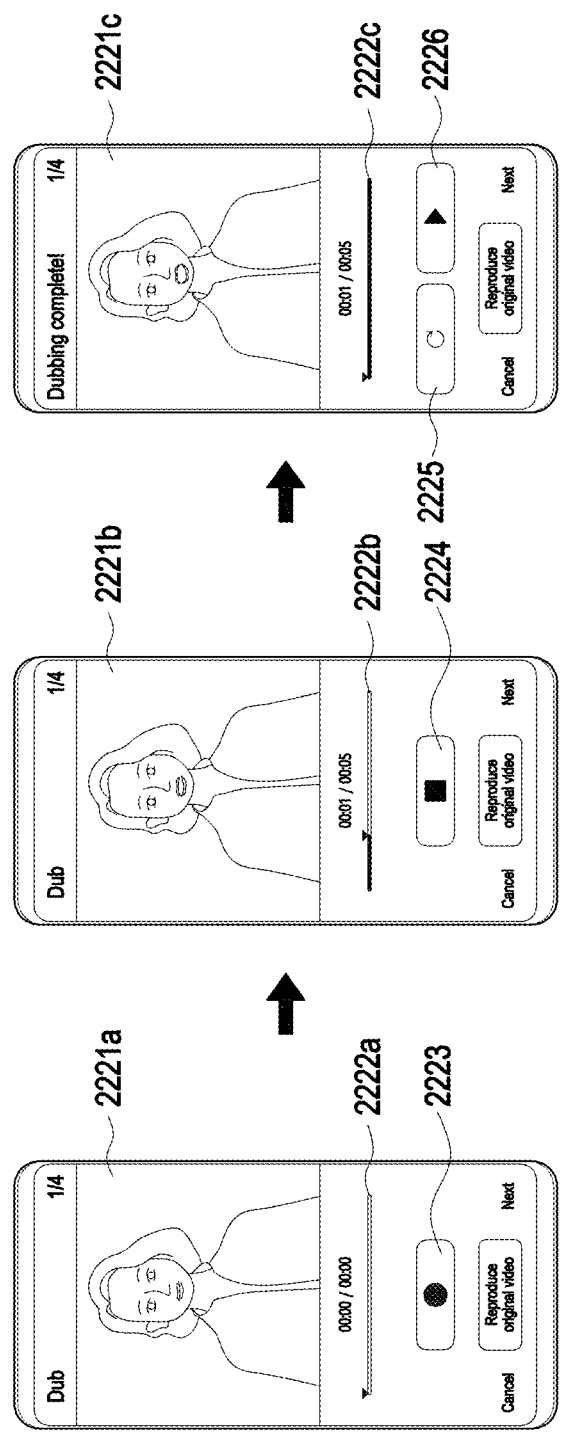

FIGS. 22A to 22C illustrate screens of the electronic device according to various embodiments.

Referring to FIG. 22A, the electronic device 101 may display an image 2201 related to a first candidate video. When a button 2211 for selection is selected while the image 2201 related to the first candidate video is displayed, the first candidate video may be selected as a target with which a voice is synthesized. The electronic device 101 may display an image 2202 related to a second candidate video on the basis of detection of a user input (for example, a swipe gesture in an up direction) for changing the candidate video. When a button 2211 for selection is selected while the image 2202 related to the second candidate video is displayed, the second candidate video may be selected as a target with which a voice is synthesized. In the present embodiment, it is assumed that the button 2211 for selection is selected while the image 2202 related to the second candidate video is displayed.

The electronic device 101 may display a first image 2221*a* of the second video as illustrated in FIG. 22B on the basis of selection of the button 2211 for selection while the image 2202 related to the second candidate video is displayed. The electronic device 101 may further display a progress bar 2222*a* indicating a reproduction time point and a button 2223 for initiating recording. When the button 2223 is selected, the electronic device 101 may sequentially display images 2221*a*, 2221*b*, and 2221*c* included in the second video, that is, may reproduce the video. Accordingly, the indication may be changed as if the reproduction time point on the progress bar 2222*b* is changed. The electronic device 101 may display a button 2224 for stopping recording while the video is reproduced, and may stop recording when the button 2224 is selected. According to the selection of the button 2223 for initiating recording, the electronic device 101 may activate a microphone and acquire voice data to be synthesized through the microphone. The electronic device 101 may display the last image 2221*c* of the video on the basis of completion of the video reproduction or the selection of the button 2224 for stopping recording. The indication may be changed such that the progress bar 2222*c* also displays the last part of the video reproduction time point. The electronic device 101 may display a button 2225 for re-recording and a button 2226 for reproduction. When the button 2225 for re-recording is selected, the electronic device 101 may start recording again and acquire voice data to be synthesized again through the microphone. When the button 2226 for reproduction is selected, the electronic device 101 may reproduce the recorded voice.

According to various embodiments, the electronic device 101 may select one of a plurality of mouth shape candidates and synthesize the same with a video automatically or according to a user selection as described above. Since the selection of one of the plurality of mouth shape candidates has been described above, a detailed description thereof is omitted herein. The electronic device 101 may display, for example, a screen 2231 indicating processing while the corresponding process is performed as illustrated in FIG. 22C, and the screen may be replaced with a video such as advertisement. When mouth shape synthesis is completed, the electronic device 101 may display an image 2232 for video reproduction. When the image 2232 for video reproduction is selected, the electronic device 101 may reproduce the synthesized video along with a voice corresponding to the acquired voice data. Meanwhile, when a deletion button 2233 is selected, the electronic device 101 may delete the corresponding video. Meanwhile, when an upload button 2234 is selected, the electronic device 101 may upload the corresponding video. Meanwhile, a server managing the uploaded video may manage uploaded videos for respective users. For example, when a request for another video uploaded by a specific user is made by a client device, the another video uploaded by the specific user may be provided. For example, the server may provide the client device with videos uploaded by the specific user and also data indicating a total number of videos uploaded by the corresponding user. When a user input (for example, a swipe input) is detected while a screen related to the specific user is displayed, the client device may transmit a request for another video to the server in response to the user input. The server may provide the client device with another video uploaded by the specific user in response to the corresponding request. Meanwhile, the electronic device 101 may further provide a soft input panel (SIP) 2236 for inputting a title of the video while displaying an image 2235 of the video. The electronic device 101 may store and/or manage a name of the corresponding video on the basis of the input through the SIP 2236.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one processor; and
   at least one memory storing instructions executable by the at least one processor and operatively connected to the at least one processor,
   wherein the instructions, when executed by the at least one processor, cause the electronic device to:
   acquire voice data to be synthesized with first images,
   generate a plurality of mouth shape candidates for each of the first images by using the voice data,
   provide a user interface capable of selecting one of the plurality of mouth shape candidates, wherein the user interface provides a function of outputting a voice corresponding to the voice data while reproducing at least some of the plurality of mouth shape candidates or at least some areas of face areas including each of at least some of the plurality of mouth shape candidates,
   based on obtaining an input with respect to the user interface, select a mouth shape candidate among the plurality of mouth shape candidates for each of the first images to obtain a plurality of selected mouth shape candidates corresponding to the first images,
   generate second images based on the plurality of selected mouth shape candidates and at least a portion of each of the first images, and
   generate third images by applying at least one super-resolution model to the generated second images.

2. The electronic device of claim 1, wherein the instructions, when executed by the at least one processor, cause the electronic device to generate at least one processed voice data by performing at least one analog processing on the voice data, input the voice data and the at least one processed voice data into a mouth shape generation model, and generate a plurality of output values from the mouth shape generation model as the plurality of mouth shape candidates.

3. The electronic device of claim 2, wherein the at least one analog processing includes at least one of an increase in an amplitude of the voice data, a decrease in the amplitude of the voice data, an increase of a reproduction speed of the voice data, a decrease in the reproduction speed of the voice data, addition of first noise to the voice data, suppression of second noise from the voice data, separation of a first background sound from the voice data, or addition of a second background sound to the voice data.

4. The electronic device of claim 1, wherein the instructions, when executed by the at least one processor, cause the electronic device to input the voice data into a plurality of mouth shape generation models and generate a plurality of output values from the plurality of mouth shape generation models as the plurality of mouth shape candidates.

5. The electronic device of claim 1, wherein the instructions, when executed by the at least one processor, cause the electronic device to provide a user interface capable of selecting a time section in which the voice data is synthesized and identify the first images corresponding to the time section in which the voice data is synthesized, based on a user input made through the user interface.

6. The electronic device of claim 1, wherein the instructions, when executed by the at least one processor, cause the electronic device to input each of the plurality of mouth shape candidates into an assessment model and select one of the plurality of mouth shape candidates, based on a plurality of scores output from the assessment model.

7. The electronic device of claim 1, wherein the instructions, when executed by the at least one processor, cause the electronic device to generate a plurality of completely synthesized images by synthesizing at least some of the third images with the first images, respectively.

8. The electronic device of claim 7, wherein the instructions, when executed by the at least one processor, cause the electronic device to perform segmentation on each of the third images, identify at least one area in each of the third images, based on a result of the segmentation, and generate the plurality of completely synthesized images by synthesizing the at least one area with the first images, respectively.

9. The electronic device of claim 1, wherein the instructions, when executed by the at least one processor, cause the electronic device to generate the voice data, based on a voice received through a microphone of the electronic device or convert text into the voice data.

10. A method of operating an electronic device, the method comprising:
    acquiring voice data to be synthesized with first images,
    generating a plurality of mouth shape candidates for each of the first images by using the voice data,
    providing a user interface capable of selecting one of the plurality of mouth shape candidates, wherein the user interface provides a function of outputting a voice corresponding to the voice data while reproducing at least some of the plurality of mouth shape candidates or at least some areas of face areas including each of at least some of the plurality of mouth shape candidates,
    based on obtaining an input with respect to the user interface, selecting a mouth shape candidate among the plurality of mouth shape candidates for each of the first images to obtain a plurality of selected mouth shape candidates corresponding to the first images,
    generating second images based on the plurality of selected mouth shape candidates and at least a portion of each of the first images, and
    generating third images by applying at least one super-resolution model to the second images.

11. The method of claim 10, wherein the generating of the plurality of mouth shape candidates comprises:
    generating at least one processed voice data by performing at least one analog processing on the voice data, inputting the voice data and the at least one processed voice data into a mouth shape generation model, and generating a plurality of output values from the mouth shape generation model as the plurality of mouth shape candidates.

12. The method of claim 11, wherein the analog processing comprises at least one of an increase in an amplitude of the voice data, a decrease in the amplitude of the voice data, an increase of a reproduction speed of the voice data, a decrease in the reproduction speed of the voice data, addition of first noise to the voice data, suppression of second noise from the voice data, separation of a first background sound from the voice data, or addition of a second background sound to the voice data.

13. The method of claim 10, wherein the generating of the plurality of mouth shape candidates comprises inputting the voice data into a plurality of mouth shape generation models and generating a plurality of output values from the plurality of mouth shape generation models as the plurality of mouth shape candidates.

14. A non-transitory computer-readable storage medium storing at least one instruction, the at least one instruction causing at least one processor to:
acquire voice data to be synthesized with first images,
generate a plurality of mouth shape candidates for each of the first images by using the voice data,
provide a user interface capable of selecting one of the plurality of mouth shape candidates, wherein the user interface provides a function of outputting a voice corresponding to the voice data while reproducing at least some of the plurality of mouth shape candidates or at least some areas of face areas including each of at least some of the plurality of mouth shape candidates,
based on obtaining an input with respect to the user interface, select a mouth shape candidate among the plurality of mouth shape candidates for each of the first images to obtain a plurality of selected mouth shape candidates corresponding to the first images,
generate second images based on the plurality of selected mouth shape candidates and at least a portion of each of the first images, and
generate third images by applying at least one super-resolution model to the second images.

15. An electronic device comprising:
at least one processor; and
at least one memory storing instructions executable by the at least one processor and operatively connected to the at least one processor,
wherein the instructions, when executed by the at least one processor, cause the electronic device to:
acquire voice data to be synthesized with at least one first image,
generate a plurality of mouth shape candidates by using the voice data,
select a mouth shape candidate among the plurality of mouth shape candidates,
generate at least one second image based on the selected mouth shape candidate and at least a portion of each of the at least one first image, and
generate at least one third image by applying at least one super-resolution model to the at least one second image,
wherein the at least one processor is further configured to divide each of the at least one second image into at least one first area corresponding to a mouth and at least one second area including a remaining area except for the first area, generate at least one first high-resolution area by applying the at least one first area to a first super-resolution model specialized for the at least one first area, generate at least one second high-resolution area by applying the at least one second area to a second super-resolution model specialized for the at least one second area, and generate the at least one third image by synthesizing the at least one first high-resolution area with the at least one second high-resolution area, respectively.

16. A method of operating an electronic device, the method comprising:
acquiring voice data to be synthesized with at least one first image,
generating a plurality of mouth shape candidates by using the voice data,
selecting a mouth shape candidate among the plurality of mouth shape candidates,
generating at least one second image based on the selected mouth shape candidate and at least a portion of each of the at least one first image, and
generating at least one third image by applying at least one super-resolution model to the at least one second image,
wherein the generating of the at least one third image comprises:
dividing each of the at least one second image into at least one first area corresponding to a mouth and at least one second area including a remaining area except for the first area,
generating at least one first high-resolution area by applying the at least one first area to a first super-resolution model specialized for the at least one first area,
generating at least one second high-resolution area by applying the at least one second area to a second super-resolution model specialized for the at least one second area, and
generating the at least one third image by synthesizing the at least one first high-resolution area with the at least one second high-resolution area, respectively.

17. A non-transitory computer-readable storage medium storing at least one instruction, the at least one instruction causing at least one processor to:
acquire voice data to be synthesized with at least one first image,
generate a plurality of mouth shape candidates by using the voice data,
select a mouth shape candidate among the plurality of mouth shape candidates,
generate at least one second image based on the selected mouth shape candidate and at least a portion of each of the at least one first image, and
generate at least one third image by applying at least one super-resolution model to the at least one second image,
wherein the at least one instruction further causes the at least one processor to:
divide each of the at least one second image into at least one first area corresponding to a mouth and at least one second area including a remaining area except for the first area,
generate at least one first high-resolution area by applying the at least one first area to a first super-resolution model specialized for the at least one first area,
generate at least one second high-resolution area by applying the at least one second area to a second super-resolution model specialized for the at least one second area, and generate the at least one third image by synthesizing the at least one first high-resolution area with the at least one second high-resolution area, respectively.

\* \* \* \* \*